(12) United States Patent
Furukawa et al.

(10) Patent No.: US 12,111,686 B2
(45) Date of Patent: Oct. 8, 2024

(54) OPTICAL UNIT, ILLUMINATION APPARATUS, DISPLAY, AND OPTICAL COMMUNICATION APPARATUS

(71) Applicant: SATURN LICENSING LLC, New York, NY (US)

(72) Inventors: Norimasa Furukawa, Tokyo (JP); Kenichi Nakaki, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 131 days.

(21) Appl. No.: 16/911,615

(22) Filed: Jun. 25, 2020

(65) Prior Publication Data

US 2021/0041911 A1   Feb. 11, 2021

(51) Int. Cl.
*G06F 1/16* (2006.01)
*G02B 3/00* (2006.01)
*G02F 1/13357* (2006.01)
*G02F 1/1335* (2006.01)

(52) U.S. Cl.
CPC .......... *G06F 1/1609* (2013.01); *G02B 3/005* (2013.01); *G02F 1/133606* (2013.01); *G02B 2003/0093* (2013.01); *G02F 1/133607* (2021.01)

(58) Field of Classification Search
CPC .............. G06F 1/1609; G02B 3/005; G02B 2003/0093; G02B 27/0927; G02F 1/133607; F21V 5/041
See application file for complete search history.

(56) References Cited

U.S. PATENT DOCUMENTS

| | | | |
|---|---|---|---|
| 5,175,783 A * | 12/1992 | Tatoh | H01L 33/58 257/E33.059 |
| 2004/0233271 A1* | 11/2004 | Nojima | B41J 2/451 347/238 |
| 2006/0280411 A1* | 12/2006 | Nishizawa | G02B 6/4246 385/94 |
| 2007/0120836 A1* | 5/2007 | Yamaguchi | G06F 3/03545 345/179 |
| 2008/0266862 A1 | 10/2008 | Shyshkin et al. | |
| 2009/0289269 A1* | 11/2009 | Naum | H01L 33/58 257/E33.006 |
| 2009/0316072 A1* | 12/2009 | Okumura | G02B 5/0268 362/628 |
| 2014/0211173 A1* | 7/2014 | Destain | G03B 21/16 353/52 |
| 2016/0349434 A1* | 12/2016 | Shikano | G02B 6/0006 |
| 2017/0343786 A1* | 11/2017 | Cooper | G02B 19/0061 |
| 2019/0137611 A1* | 5/2019 | Gudeman | G01S 7/4815 |

FOREIGN PATENT DOCUMENTS

| | | | |
|---|---|---|---|
| CN | 105723530 | 6/2016 | |
| JP | 2003282412 | 10/2003 | |
| JP | 2004119045 | 4/2004 | |
| JP | 2005195708 | 7/2005 | |
| JP | 2007335209 | 12/2007 | |
| JP | 2018142002 | 9/2018 | |
| KR | 1020120090179 A * | 8/2010 | ............. F21S 2/00 |

\* cited by examiner

*Primary Examiner* — Alicia M Harrington

(74) *Attorney, Agent, or Firm* — Richard LaPeruta

(57) ABSTRACT

An optical unit includes a ball lens and a light source. The ball lens condenses light and outputs the condensed light. The light source has a light emitting surface and the light source outputs light toward the ball lens. The light emitting surface is located closer to the ball lens than a focal position of the ball lens.

13 Claims, 50 Drawing Sheets

COMPARATIVE EXAMPLE (USING LOUVER)

FIG. 14A SIDE SURFACE

FIG. 14B BOTTOM SURFACE $\theta 1A > \theta 1B \Rightarrow \theta 2A > \theta 2B$ $n1 \sin \theta 1 = n2 \sin \theta 2$

| LIGHT SOURCE DIAMETER $\phi$ [mm] | 1.2 | 2 | 3 | 4 | 5 |
|---|---|---|---|---|---|
| RATIO OF LIGHT SOURCE DIAMETER $\phi$ TO LENS DIAMETER D ($\phi$/D) [%] | 20% | 33% | 50% | 67% | 83% |
| PROPORTION OF LIGHT BEAMS PASSING THROUGH LENS [%] | 88.96% | 84.63% | 77.39% | 69.27% | 61.19% |
| ROPORTION OF LIGHT BEAMS NOT PASSING THROUGH LENS [%] | 3.03% | 7.74% | 15.63% | 24.49% | 33.30% |
| HALF WIDTH [deg] | 10 | 18 | 26 | 33 | 39 |

FIG. 25

| SIDE LENGTH a [mm] OF SQUARE-SHAPED LIGHT SOURCE | 2 |
| --- | --- |
| LIGHT SOURCE DIAMETER φ [mm] AS CONVERTED INTO CIRCULAR SHAPE | 2.25675833 |
| RATIO OF LIGHT SOURCE DIAMETER φ TO LENS DIAMETER D (φ/D) [%] | 38% |
| PROPORTION OF LIGHT BEAMS PASSING THROUGH LENS [%] | 82.21% |
| PROPORTION OF LIGHT BEAMS NOT PASSING THROUGH LENS [%] | 10.40% |
| HALF WIDTH [deg] | 18 |

| ($\phi/D = 38\%$; FIXED) DISTANCE $\Delta L [\mu m]$ | 20 | 100 | 200 | 300 | 400 | 500 |
|---|---|---|---|---|---|---|
| DISTANCE/ LENS DIAMETER ($\Delta L/D$) [%] | 0.333% | 1.667% | 3.333% | 5.000% | 6.667% | 8.333% |
| PROPORTION OF LIGHT BEAMS PASSING THROUGH LENS [%] | 82.21% | 78.40% | 73.99% | 69.93% | 66.18% | 62.72% |
| PROPORTION OF LIGHT BEAMS NOT PASSING THROUGH LENS [%] | 10.40% | 14.55% | 19.36% | 23.78% | 27.87% | 31.64% |
| HALF WIDTH [deg] | 18 | 18 | 17 | 17 | 16 | 16 |

FIG. 34

| WALL FOR LIGHT-BEAM CAPTURING | PRESENT | ABSENT |
|---|---|---|
| DISTANCE $\Delta L [\mu m]$ | 500 | 500 |
| DISTANCE/LENS DIAMETER ($\Delta L/D$) [%] | 0.015% | 0.010% |
| PROPORTION OF LIGHT BEAMS PASSING THROUGH LENS [%] | 90.47% | 62.72% |
| PROPORTION OF LIGHT BEAMS NOT PASSING THROUGH LENS [%] | 0.00% | 31.64% |
| HALF WIDTH [deg] | 16 | 16 |

FIG. 37

COMPARATIVE EXAMPLE

COMPARATIVE EXAMPLE

OPTICAL UNIT, ILLUMINATION APPARATUS, DISPLAY, AND OPTICAL COMMUNICATION APPARATUS

CROSS-REFERENCE TO RELATED APPLICATIONS

The present application claims priority from Japanese Patent Application No. 2019-145583 filed on Aug. 7, 2019, the entire contents of which are hereby incorporated by reference.

BACKGROUND OF THE INVENTION

The disclosure relates to an optical unit, an illumination apparatus, a display, and an optical communication apparatus that use light from a light source.

There have been proposed various methods for condensing light exhibiting a Lambertian distribution from a light source such as a light emitting diode (LED) to obtain a desired light distribution characteristic. For example, reference is made to Japanese Unexamined Patent Application Publication Nos. 2014-011107 and 2014-149915. Japanese Unexamined Patent Application Publication No. 2014-011107 (JP-A 2014-011107) proposes a configuration in which a lens array including a plurality of hemispherical lenses is disposed over top surfaces of a plurality of LED element substrates provided with respective LED elements thereon. A slanted reflection surface is provided on a wall face of each of the LED element substrates. According to the technique described in JP-A 2014-011107, the direction of light from the LED element is adjusted through the following two steps. As the first step, the light from the LED element is caused to impinge on and be reflected off the foregoing reflection surface. As the second step, the direction of the reflected light is adjusted with the lens array.

According to the technique described in JP-A 2014-011107, a reflection loss results because the light from the LED element undergoes reflection at the wall face of the LED element substrate in the first step. Furthermore, because the lenses of the lens array used in the second step are hemispherical, there is an issue that a large refractive effect is difficult to achieve.

It is well known as a basic technique that, like the technique described in JP-A 2014-011107, a recess or a bank is formed around the LED element as a primary reflection surface to initially adjust the direction of a light beam to some extent, and a condenser lens provided over the primary reflection surface is used to further adjust the direction of the light beam.

In contrast, according to the technique of the disclosure, as will be described later, the primary reflection surface in the technique described in JP-A 2014-011107 may be omitted. It is a feature of the disclosure that light outputted from an LED is caused to enter a lens directly. This feature makes it possible to improve light utilization efficiency because it does not cause any reflection loss occurring at the primary reflection surface.

Japanese Unexamined Patent Application Publication No. 2014-149915 (JP-A 2014-149915) proposes a technique concerning a light source unit of a light guide plate system. According to the technique described therein, individual output points for light beams formed on the light guide plate are assumed as secondary light sources, and condenser lenses of a plano-convex shape are disposed at the output points on the light guide plate to allow collimated light to be outputted. However, because the plano-convex lenses have a refractive surface on one side only, there is a limitation in obtaining a large angle of refraction.

For light beams outputted through the light guide plate, the directions of light beam vectors are somewhat limited. Taking advantage of this, the technique described in JP-A 2014-149915 follows the following two steps: the first step of limiting the range of output of light beams using the light guide plate; and the second step of further adjusting the direction of the light beams using the lenses.

Both of the techniques described in JP-A2014-011107 and JP-A2014-149915 perform stepwise condensing of light from a light source, and are different from a light condensing method that entirely depends on the refractive effect of lenses alone.

BRIEF SUMMARY OF THE INVENTION

An optical unit according to one embodiment of the disclosure includes a ball lens and a light source. The ball lens is configured to condense light and to output the condensed light. The light source has a light emitting surface and is configured to output light toward the ball lens. The light emitting surface is located closer to the ball lens than a focal position of the ball lens.

An illumination apparatus according to one embodiment of the disclosure includes a ball lens and a light source. The ball lens is configured to condense light and to output the condensed light as illumination light. The light source has a light emitting surface and is configured to output light toward the ball lens. The light emitting surface is located closer to the ball lens than a focal position of the ball lens.

A display according to one embodiment of the disclosure includes a plurality of ball lenses configured to condense light and to output the condensed light, and a plurality of light sources provided respectively in correspondence with the plurality of ball lenses. Each of the plurality of light sources has a light emitting surface and is configured to output light toward a corresponding one of the plurality of ball lenses. The light emitting surface is located closer to the corresponding one of the plurality of ball lenses than a focal position of the corresponding one of the plurality of ball lenses.

An optical communication apparatus according to one embodiment of the disclosure includes an optical transmitter including a ball lens and a light source. The ball lens is configured to condense light and to output the condensed light. The light source has a light emitting surface and is configured to output light toward the ball lens. The light emitting surface is located closer to the ball lens than a focal position of the ball lens.

BRIEF DESCRIPTION OF DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 25 is an explanatory diagram illustrating simulation results of optical characteristics of the optical unit according to one embodiment with varying light source diameters relative to the lens diameter of the ball lens.

FIG. 34 is an explanatory diagram illustrating simulation results of optical characteristics of the optical unit according to one embodiment with varying distances between the light emitting surface of the light source and the ball lens.

FIG. 37 is an explanatory diagram illustrating simulation results of optical characteristics of the optical unit according to one embodiment in the presence and absence of a wall that reflects light beams from the light source toward the ball lens.

DETAILED DESCRIPTION

Figure 1:
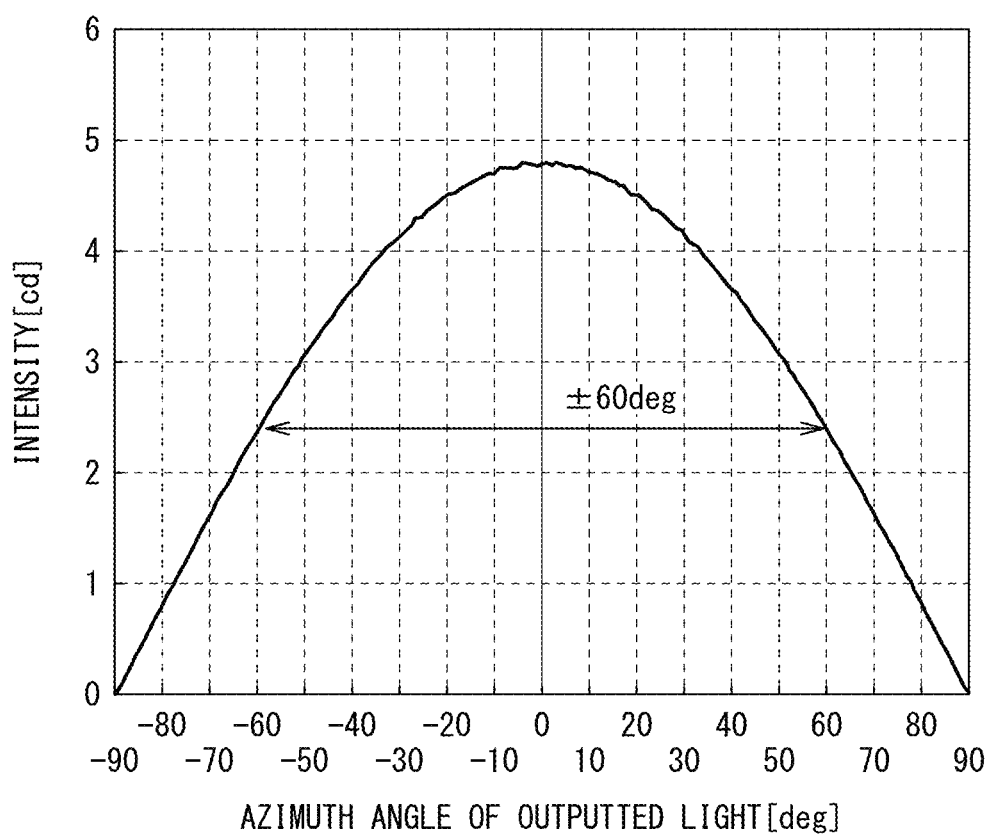
FIG. 1 is a characteristic diagram illustrating an example of a light distribution characteristic of a light source of a Lambertian light distribution.

To condense light to obtain a desired light distribution characteristic, what is desired is high light utilization efficiency.

It is desirable to provide an optical unit, an illumination apparatus, a display, and an optical communication apparatus that make it possible to obtain a desired light distribution characteristic with high efficiency.

In the following, some example embodiments of the disclosure will be described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Like elements are denoted with like reference numerals to avoid any redundant description. Note that the description will be given in the following order.

0. Comparative Example
1. First Embodiment (Optical unit, illumination apparatus, and display) (FIGS. 1, 2, 3, 4, 5, 6, 7, 8, 9, 10, 11, 12, 13, 14A, 14B, 15, 16, 17, 18, 19, 20, 21, 22, 23, 24A, 24B, 24C, 24D, 24E, 25, 26, 27A, 27B, 27C, 27D, 27E, 28, 29, 30, 31A, 31B, 32, 33, 34, 35, 36, 37, 38, 39, 40, 41, 42, 43, 44, 45, 46, 47, 48, 49, 50, 51, 52, and 53)
    1.1. Overview
    1.2. Detailed Configuration Conditions and Workings
    1.3. Effects
    1.4. Modification Example
2. Second Embodiment (Example of application to optical communication apparatus) (FIGS. 54 to 58)
    2.1. Configuration
    2.2. Workings and Effects
3. Other Embodiment

1. First Embodiment

1.1. Overview

An optical unit according to a first embodiment of the disclosure includes, as illustrated in, e.g., FIG. 6 to be described later, a ball lens 2 that condenses light and outputs the condensed light, and a light source 1 that outputs light toward the ball lens 1. The ball lens 2 is a spherical lens including a material transparent to light to be used. The light source 1 includes, e.g., an LED, and is disposed near the ball lens 2. The light source 1 has a light emitting surface. In one embodiment, the light emitting surface is located closer to the ball lens 2 than a focal position of the ball lens 2.

Figure 2:
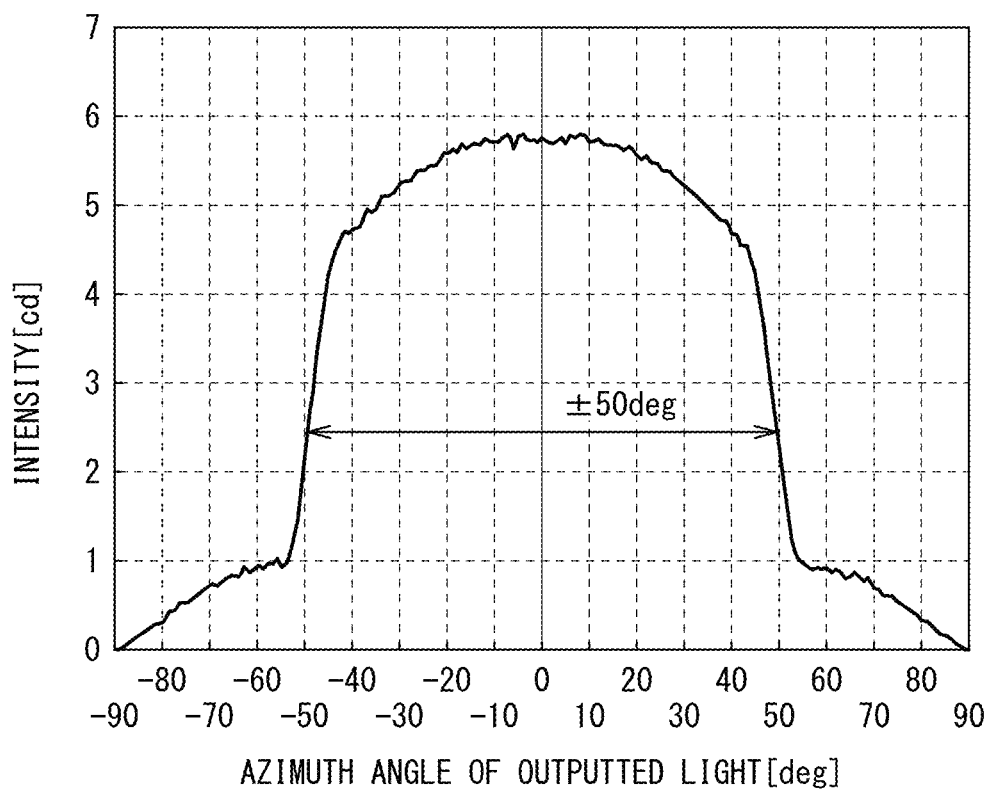
FIG. 2 is a characteristic diagram illustrating an example of a light distribution characteristic of the light source when using a reflection wall.
Figure 3:
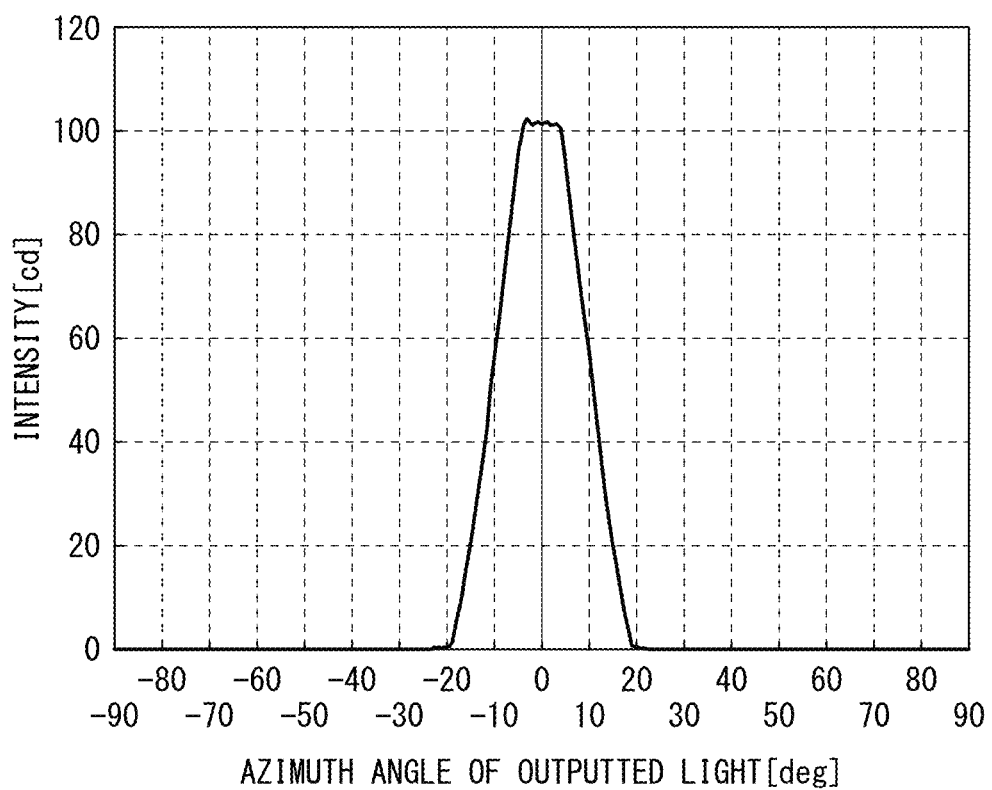
FIG. 3 is a characteristic diagram illustrating an example of a light distribution characteristic of an optical unit according to one embodiment of the disclosure in which a ball lens and the light source of a Lambertian light distribution are combined together.

FIG. 1 illustrates an example of a light distribution characteristic of the light source 1 of a Lambertian light distribution. FIG. 2 illustrates an example of a light distribution characteristic of the light source 1 when using a reflection wall. FIG. 3 illustrates an example of a light distribution characteristic of the optical unit according to the first embodiment of the disclosure in which the ball lens 2 and the light source 1 of a Lambertian light distribution are combined together.

In each of FIGS. 1 to 3, the horizontal axis represents the azimuth angle (in degrees) of outputted light beams, and the vertical axis represents the intensity (in cd) of the light beams. Unless otherwise specified, the same applies to other drawings illustrating light distributions to be referred to later.

The characteristic of the light source 1 of a Lambertian light distribution illustrated in FIG. 1 is common to, for example, surface-mounting LEDs. FIG. 2 illustrates a characteristic in a case where a cylindrical reflection wall is provided around the light source 1 of the Lambertian light distribution characteristic illustrated in FIG. 1 to thereby narrow the light distribution angle range.

The Lambertian light distribution illustrated in FIG. 1 provided by the light source 1 exhibits a half width on the order of, for example, 60 degrees. As illustrated in FIG. 2, the use of the reflection wall makes the half width be on the order of ±50 degrees, for example. In the case of the light source 1 producing a Lambertian light distribution as illustrated in FIG. 1, it is difficult to re-condense light outputted from the light source 1 with existing techniques. For example, merely providing the cylindrical reflection wall is insufficient for achieving a sufficiently small half width, as seen from FIG. 2. In contrast, the optical unit according to the first embodiment makes it possible to collimate a light beam to achieve a half width on the order of, for example, ±15 degrees, as illustrated in FIG. 3.

It should be noted that the characteristic illustrated in FIG. 3 is exemplary, and the half width may be adjusted as appropriate with the optical unit according to the first embodiment. As will be described later, the half width is appropriately adjustable by adjusting, for example but not limited to, a ratio ΔL/D between a lens diameter D of the ball lens 2 and a distance ΔL between the light emitting surface of the light source 1 and the ball lens 2, a ratio φ/D between the lens diameter D of the ball lens 2 and a light source diameter φ. As used herein, the "light source diameter" refers to a diameter of the light emitting surface of the light source 1, including a circle-equivalent diameter of the light emitting surface.

Figure 4:
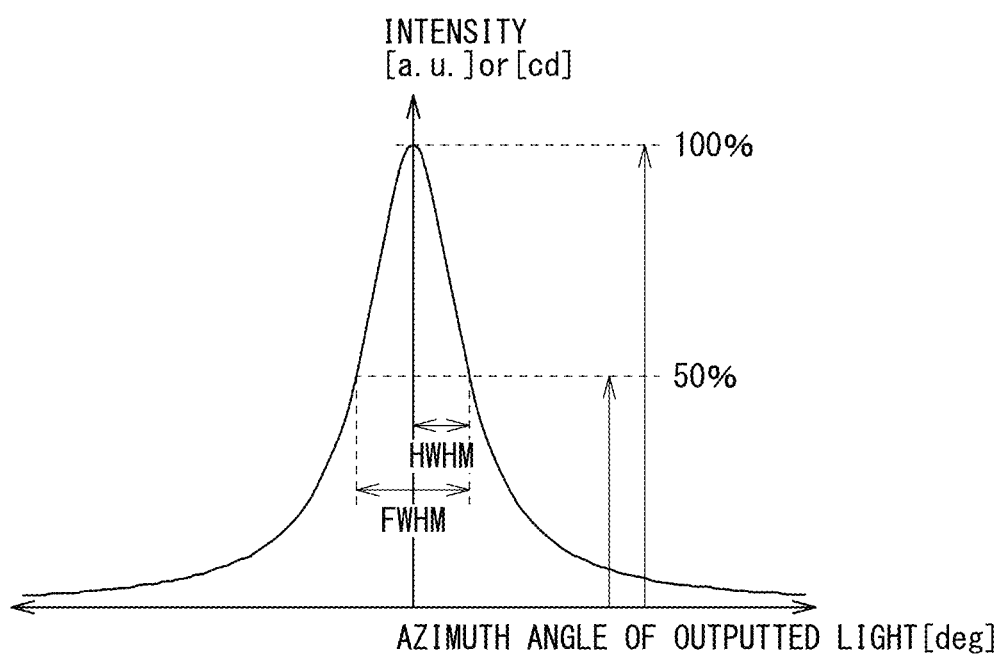
FIG. 4 is an explanatory diagram illustrating an overview of a half width with respect to azimuth angles of outputted light beams.

Now, a description will be given of a half width of a light distribution with respect to angle. Here, the light distribution refers to an intensity distribution of light beams with respect to the azimuth angle at which the light beams are outputted. The angle refers to the azimuth angle of the light beams outputted. FIG. 4 illustrates an overview of the half width with respect to the azimuth angle of outputted light beams. In FIG. 4, the horizontal axis represents the azimuth angle (in degrees) of outputted light beams, and the vertical axis represents the intensity (in cd or a.u. (arbitrary units)) of the light beams. As illustrated in FIG. 4, a difference between the azimuth angles at which the intensity of the light beams is half the peak value is referred to as full width at half maximum (FWHM). As used herein, the term "half width" refers to a half width at half maximum (HWHM), which is half the value of the full width at half maximum.

Figure 5:
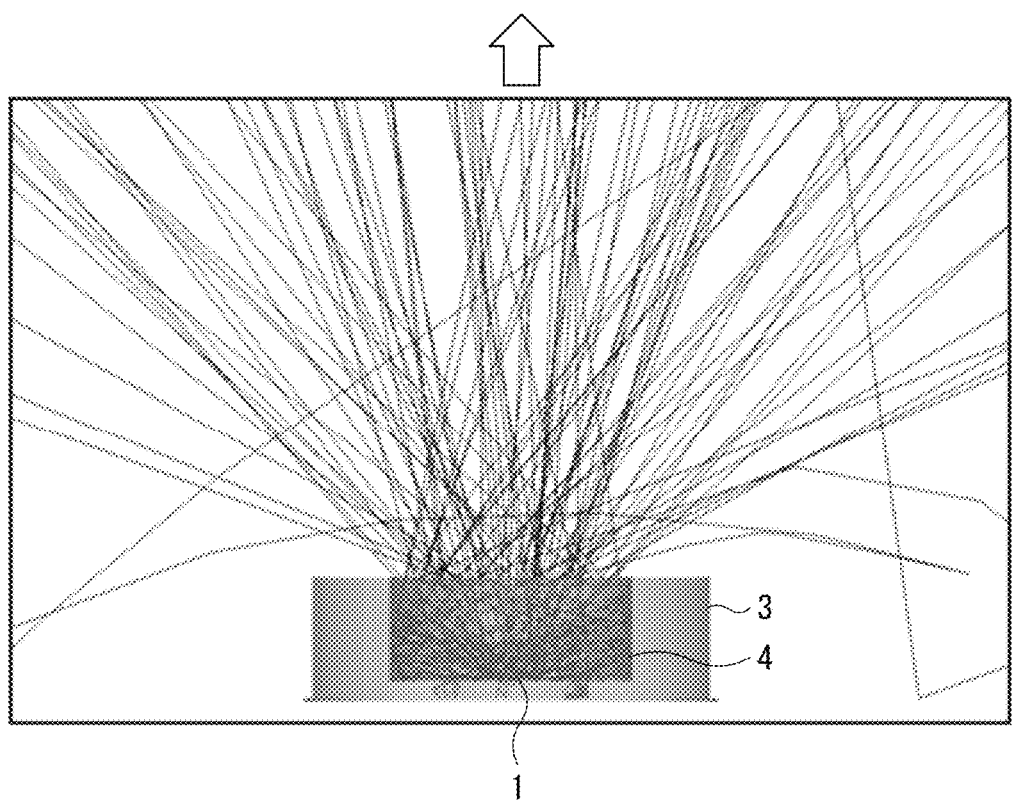
FIG. 5 is a side view diagram illustrating a configuration example of an optical unit according to a comparative example along with simulation results of trajectories of outputted light beams.
Figure 6:
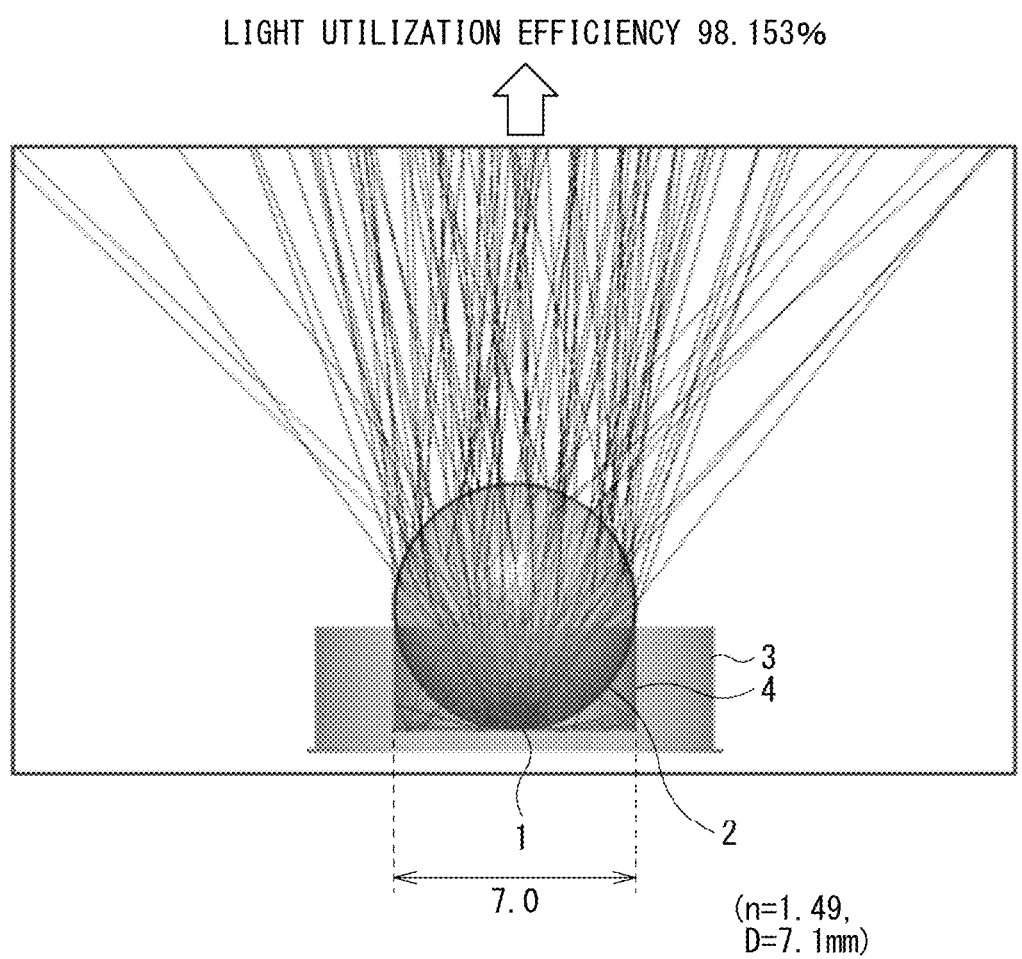
FIG. 6 is a side view diagram illustrating a configuration example of the optical unit according to one embodiment along with simulation results of trajectories of outputted light beams.
Figure 7:
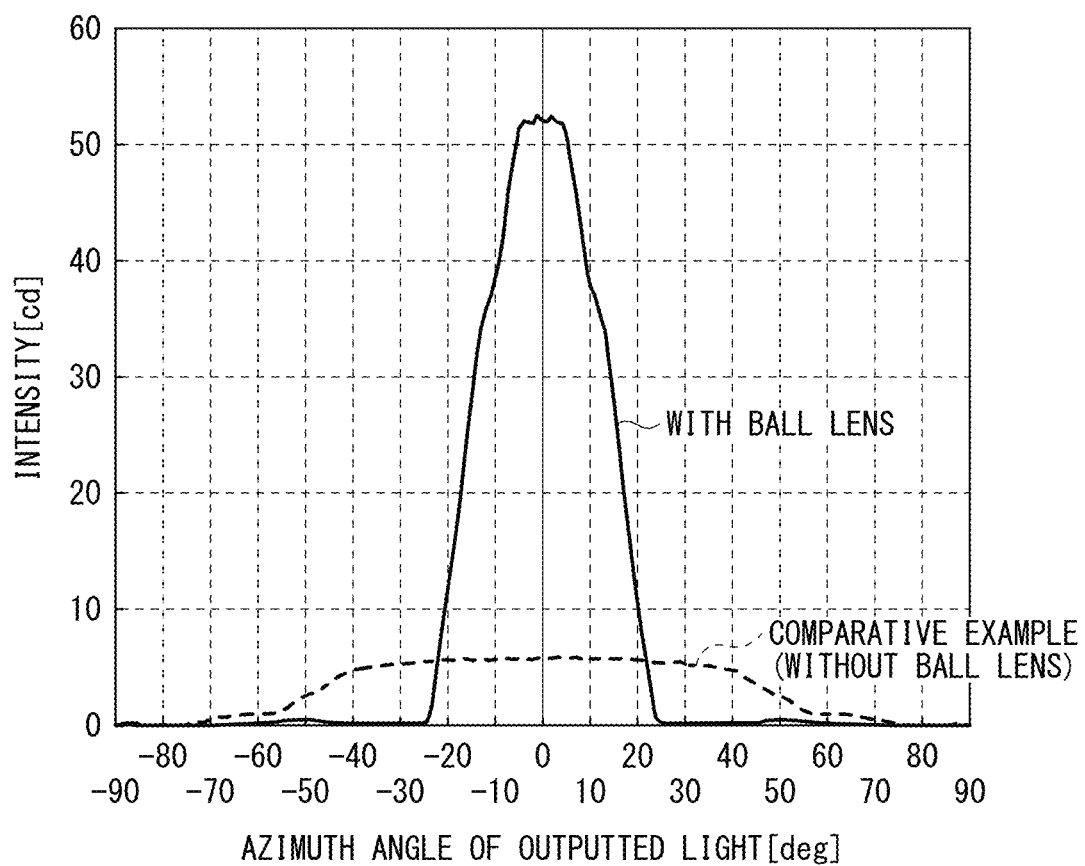
FIG. 7 is a characteristic diagram illustrating a comparison of light distribution characteristic between the optical unit according to the comparative example and the optical unit according to one embodiment.

FIGS. 5 to 7 illustrate simulation results of more specific characteristics. FIG. 5 illustrates a configuration example of an optical unit according to a comparative example in a side view, along with simulation results of trajectories of outputted light beams. FIG. 6 illustrates a configuration example of the optical unit according to the first embodiment in a side view, along with simulation results of trajectories of outputted light beams. FIG. 7 illustrates a comparison of light distribution characteristic between the optical unit according to the comparative example and the optical unit according to the first embodiment.

The optical unit according to the comparative example illustrated in FIG. 5 has a structure in which the light source 1 of a Lambertian light distribution such as an LED is surrounded by a cylindrical wall 3. The wall 3 has an inner surface (a wall face) that functions as a reflection surface 4 to cause scatter reflections of light from the light source 1. This makes it possible to provide a half width on the order of, for example, ±50 degrees, given that a half width in a case without the wall 3 is on the order of ±60 degrees. However, in the optical unit according to the comparative example illustrated in FIG. 5, a large proportion of light beams is reflected off the reflection surface 4 of the wall 3. This causes the optical unit to be affected by scatter reflections, resulting in lower efficiency. For example, the light utilization efficiency is 88.442%.

In contrast, in the optical unit according to the first embodiment illustrated in FIG. 6, the ball lens 2 is provided over the light source 1, in contrast to the configuration of the optical unit according to the comparative example. The wall 3 may be disposed with the reflection surface 4 situated around the light source 1 and the ball lens 2 to thereby reflect light from the light source 1 toward the ball lens 2. The ball lens 2 may include, for example but not limited to, a material having a lens diameter D of 7.1 mm and a uniform refractive index n of 1.49. The wall 3 may have an inner diameter of, for example but not limited to, 7.0 mm. In the optical unit according to the first embodiment illustrated in FIG. 6, the light source 1 is disposed with the light emitting surface located closer to the ball lens 2 than a focal position of the ball lens 2. This allows almost all of light emitted from the light source 1 to be captured into the ball lens 2 to achieve improved light utilization efficiency. The optical unit according to the first embodiment illustrated in FIG. 6 achieves a light utilization efficiency of 98.153%, for example. Furthermore, as illustrated in FIG. 7, the optical unit according to the first embodiment illustrated in FIG. 6 exhibits remarkably higher condensing performance for outputted light beams as compared with the optical unit according to the comparative example illustrated in FIG. 5, being able to condense light to provide a half width on the order of 15 degrees. This means that the optical unit according to the first embodiment illustrated in FIG. 6 is able to enhance both of light utilization efficiency and light condensing performance at the same time.

The optical unit according to the first embodiment may have a basic configuration in which a single ball lens 2 corresponds to a single light source 1 such as an LED element; however, an array configuration including a plurality of light sources 1 and a plurality of ball lenses 2 is also possible. By two-dimensionally arranging the light sources 1 and the ball lenses 2 into an array, it is possible to provide a surface light source configuration as a whole.

Figure 8:
FIG. 8 is a side view diagram illustrating an example of arrayed ball lenses in the optical unit according to one embodiment.
Figure 9:
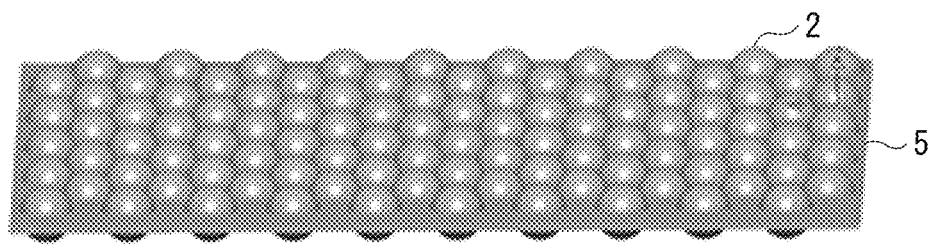
FIG. 9 is a perspective diagram illustrating an example of the arrayed ball lenses in the optical unit according to one embodiment.
Figure 10:
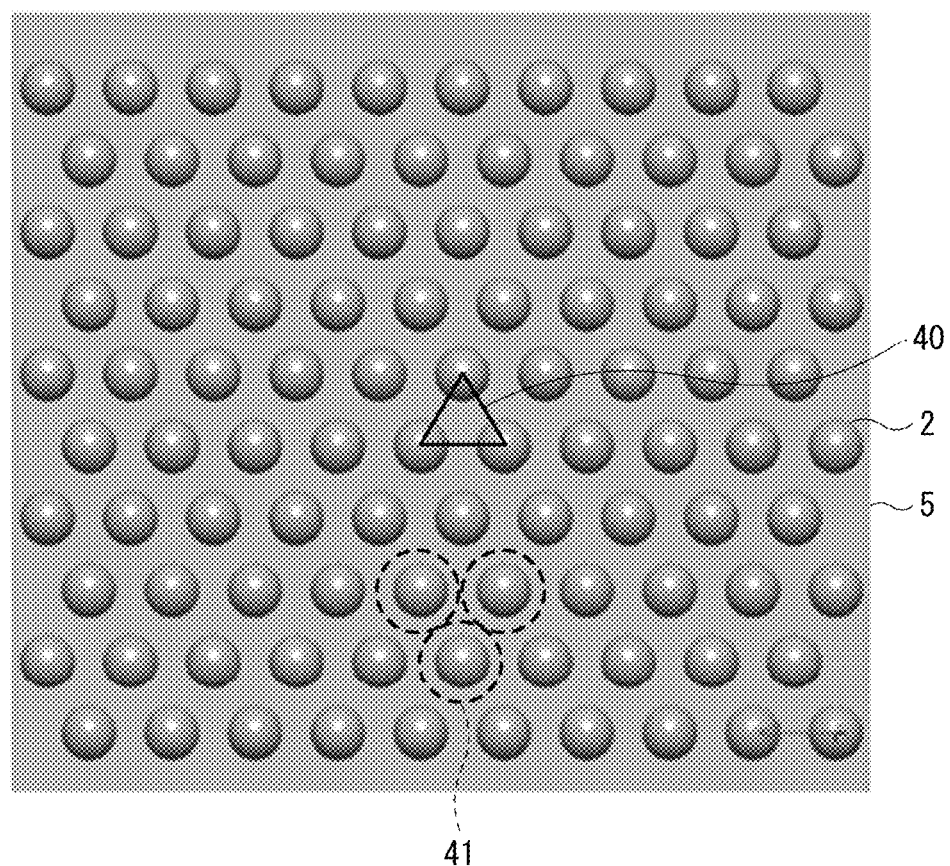
FIG. 10 is a planar diagram illustrating an example of the arrayed ball lenses in the optical unit according to one embodiment.

FIGS. 8 to 10 illustrate a configuration example of arrayed ball lenses 2 in the optical unit according to the first embodiment. FIG. 8 is a side view. FIG. 9 is a perspective view. FIG. 10 is a plan view.

As in the configuration example illustrated in FIGS. 8 to 10, the ball lenses 2 may be arrayed and integrated with each other by integral molding, for example. The configuration example may include a brim part (a peripheral part) 5 in addition to the ball lenses 2, the brim part 5 being uniform in thickness. A plurality of light sources 1 may be provided respectively in correspondence with the plurality of ball lenses 2. For example, in a case where a surface light source is formed by arranging the plurality of light sources 1 at a regular pitch on a plane, arranging the ball lenses 2 into an array in combination with the light sources 1 provides the surface light source with a light distribution characteristic achieving high light condensing performance, and improves the light utilization efficiency of the surface light source. In the configuration example illustrated in FIGS. 8 to 10, the plurality of ball lenses 2 is all integrated with each other; however, the plurality of ball lenses 2 may be divided in design into a plurality of separate areas in a plane to the extent possible in consideration of potential changes in dimensions such as expansion and contraction, etc. Furthermore, in the configuration example illustrated in FIGS. 8 to 10, as indicated by solid lines 40 in FIG. 10, three adjacent ball lenses 2 are spaced from each other and disposed at the three vertex positions of a virtual, substantially equilateral triangle. This makes it possible to provide a surface light source with reduced unevenness in luminance. It should be noted that to arrange the ball lenses 2 as densely as possible, the ball lenses 2 may be, for example, increased in lens dimeter D to allow every adjacent ball lenses 2 to be in contact or nearly in contact with each other, as indicated by broken lines 41 in FIG. 10.

Figure 11:
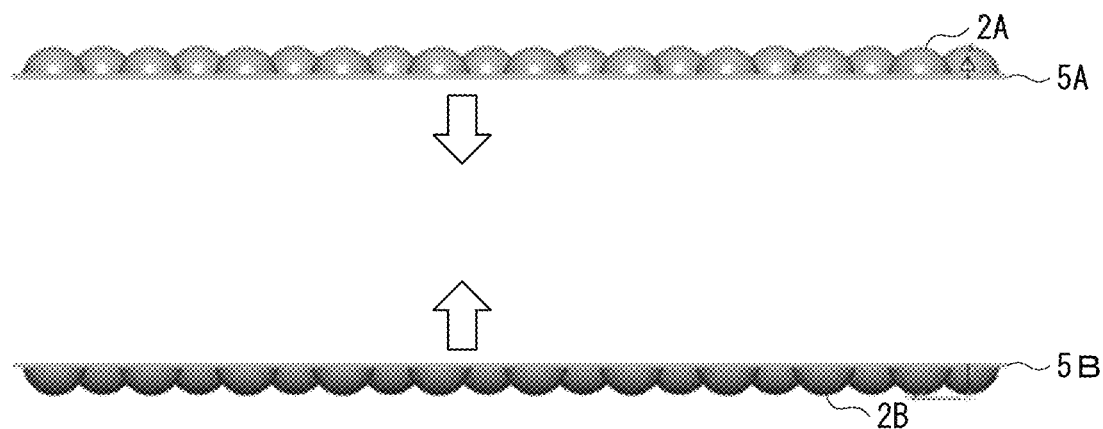
FIG. 11 is a side view diagram illustrating an example of an alternative method of manufacturing the arrayed ball lenses in the optical unit according to one embodiment.

The arrayed ball lenses 2 may be manufactured by a method other than integral molding. FIG. 11 illustrates an example of such other manufacturing methods for the arrayed ball lenses 2. For example, the arrayed ball lenses 2 may be manufactured by bonding two array members to each other. The two array members may be, for example but not limited to, upper and lower portions of an entire array structure of the ball lenses 2 and brim part 5 divided at any point along the thickness of the brim part 5 illustrated in FIGS. 8 and 9. As a non-limiting example, FIG. 11 illustrates a method of manufacturing the arrayed ball lenses 2 by bonding a first array member including a plurality of half or substantially half ball lenses (hemispherical or substantially hemispherical lenses) 2A and a brim part 5A, and a second array member including a plurality of half or substantially half ball lenses (hemispherical or substantially hemispherical lenses) 2B and a brim part 5B, to each other. Note that the brim part 5A and the brim part 5B may be different in thickness.

Figure 12:
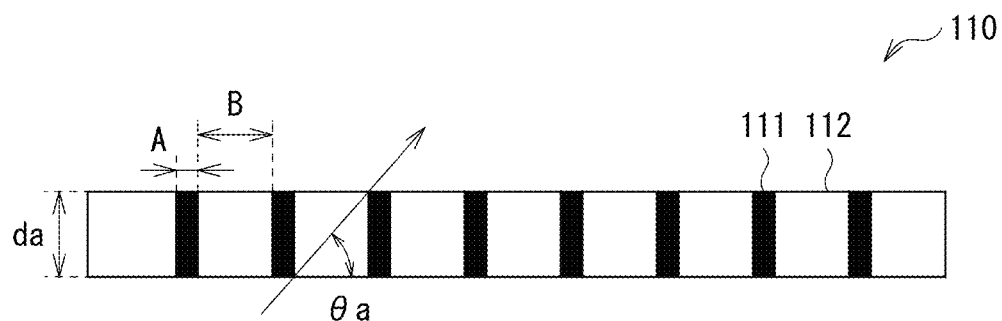
FIG. 12 is a cross-sectional diagram illustrating an example of a louver that limits light.
Figure 13:
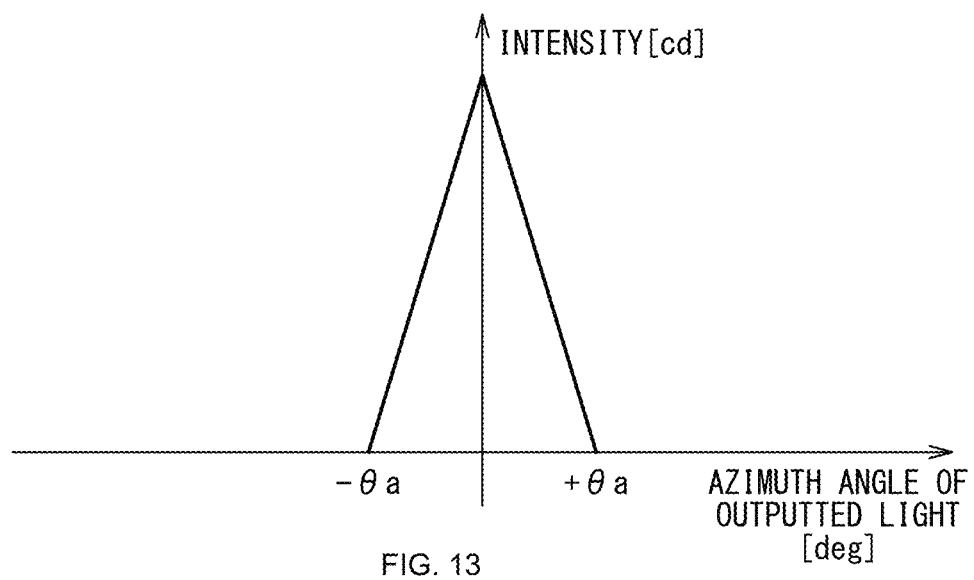
FIG. 13 is a characteristic diagram illustrating an example of a light distribution characteristic of an optical unit using the louver.

FIG. 12 illustrates an example of a louver 110 that limits light. FIG. 13 illustrates an example of a light distribution characteristic of an optical unit using the louver 110.

As illustrated in FIG. 12, the louver 110 includes a light-shielding layer (light-absorbing layer) 111 having a width A and a light-transmitting layer 112 having a width B, which may be alternately arranged in fixed size proportions. Although not illustrated in FIG. 12, the louver 110 may be provided over the light source 1. Light beams from the light source 1 are partially cut off by the light-shielding layer 111. On the basis of a relation to a thickness da of the louver 110, a maximum angle θa of light beams transmitted through the light-transmitting layer 112 at the louver 110 is determined as follows: tan(θa)=da/B, then θa=a tan(da/B). Light beams from the light source 1 are limited to a certain range to cause the transmitted light beams to be at an angle of θa or less. The resulting light distribution characteristic as an optical unit is as illustrated in FIG. 13.

To obtain light in a desired direction as an optical unit, using the louver 110 illustrated in FIG. 12 is one conceivable method. The louver 110 absorbs and eliminates light in directions other than a specific direction, thus allowing light in the specific direction to remain. In the method using the louver 110, light beams in directions not intended for use are absorbed by the louver 110 and thereby eliminated as a loss. The method is thus typically extremely low in light utilization efficiency, although making it possible to obtain light beams of a desired azimuth angle.

In the first embodiment, a method of condensing and collimating light beams from the light source 1 using the ball lens 2 is presented. To condense the light beams efficiently, there are optimum configuration conditions such as an optimum lens diameter D of the ball lens 2, an optimum size (light source diameter CD) of the light source 1 relative to the size of the ball lens 2, an optimum positional relationship, etc. Those optimum configuration conditions will be described in detail later.

Figure 14:
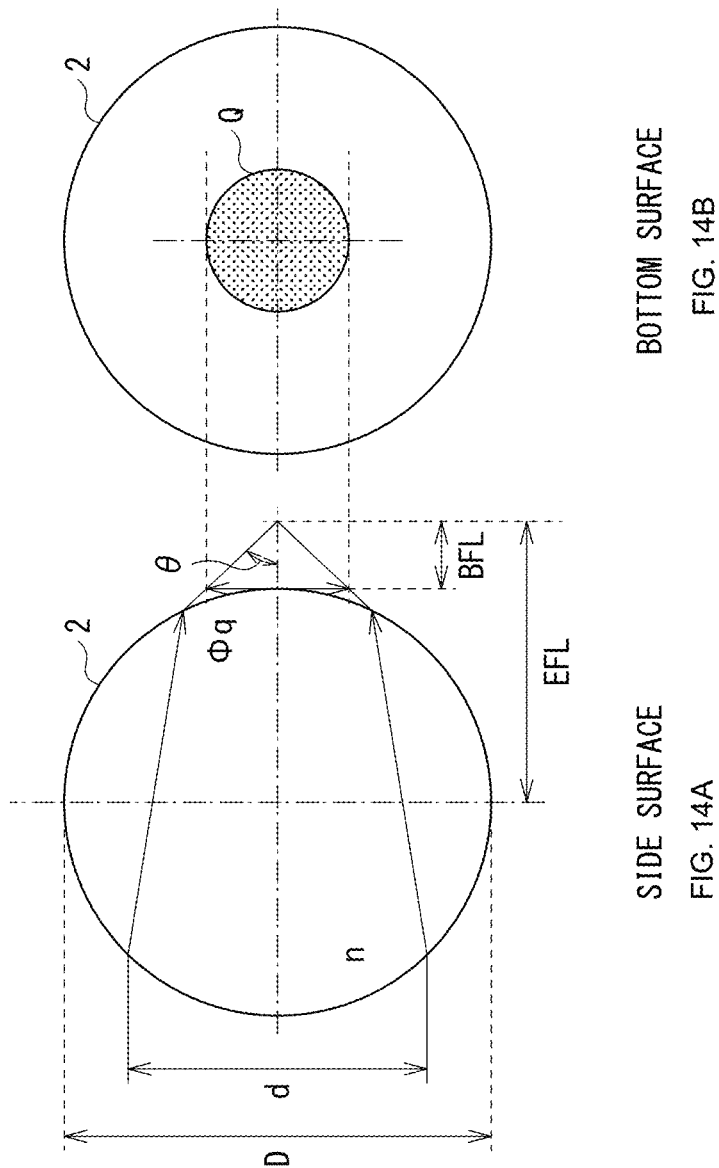
FIGS. 14A and 14B are explanatory diagrams illustrating dimensions, etc. of the ball lens.

Now, before describing the optimum configuration conditions for the optical unit according to the first embodiment, definitions of dimensions, etc. of the ball lens 2 will be described with reference to FIGS. 14A and 14B. For the sake of explanation, FIGS. 14A and 14B illustrate a state where a parallel light beam is caused to enter the ball lens 2 in a direction opposite to that in the case of use as the optical unit.

Various parameters relating to the ball lens 2 are defined as follows.

d: entering beam diameter
D: lens diameter of ball lens 2
EFL: focal length of ball lens 2
BFL: back focus of ball lens 2
n: refractive index of material of ball lens 2
nm: refractive index of object space (image space) (which is equal to 1 in the case of air)
NA: aperture ratio
EFL=nD/4(n−1)
BFL=EFL−D/2
NA may be expressed by the following expression (1).

$$NA = nm\sin\theta = \frac{1}{\sqrt{1 + 4\left(\frac{nD}{4d(n-1)}\right)^2}} \tag{1}$$

Here, a diameter of a light-beam transmission region at the position of a tangential plane of the ball lens 2 when a parallel light beam having entered the ball lens 2 is outputted from the ball lens 2 will be referred to as a light-beam transmission region diameter, and denoted by a symbol φq. The light-beam transmission region diameter φq is a diameter of an explanatory region Q to be used as a comparative reference for a light emitting region of the light source 1 in explaining the optimum configuration conditions later. In the optical unit according to the first embodiment, the light source 1 of the size of the light source diameter φ may be disposed close to the region Q. As will be described later, in one example embodiment, a micro-light source with a light source diameter φ satisfying φ/D<38% may be disposed as the light source 1 in contact with the ball lens 2.

The optical unit according to the first embodiment is usable as an illumination apparatus, and as a display.

Figure 15:
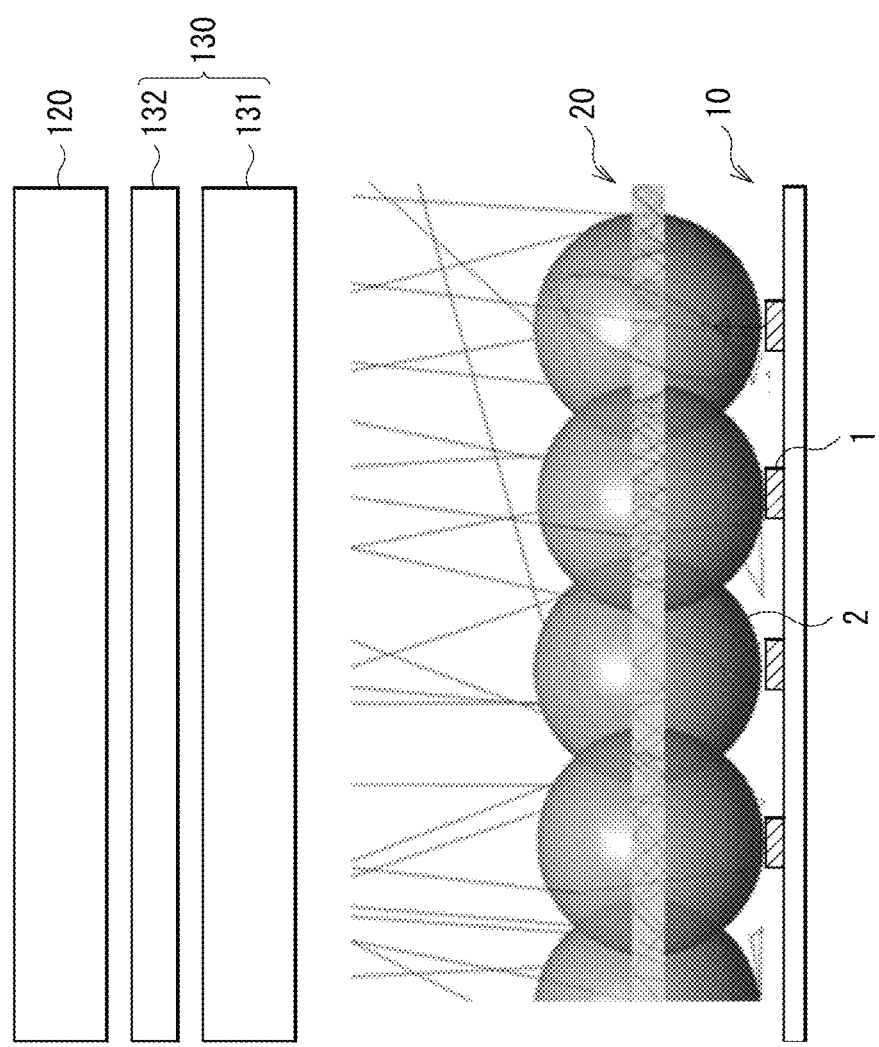
FIG. 15 is a cross-sectional diagram illustrating a first configuration example of an illumination apparatus and a display according to one embodiment.

FIG. 15 illustrates a first configuration example of an illumination apparatus and a display according to the first embodiment. The display illustrated in FIG. 15 includes a liquid crystal display device 120 as an optical modulator, and a direct-type backlight (the illumination apparatus) including the optical unit according to the first embodiment. The liquid crystal display device 120 is an optical modulator that modulates illumination light from the illumination apparatus to display an image.

The illumination apparatus may include a light source arrangement layer 10, an outputting and condensing function layer 20, and an optical sheet layer 130. The optical sheet layer 130 may correspond to a specific but non-limiting example of an "optical sheet" according to one embodiment of the disclosure. A plurality of light sources 1 may be arrayed on the light source arrangement layer 10. A plurality of ball lenses 2 corresponding to the plurality of light sources 1 may be arrayed in the outputting and condensing function layer 20. The plurality of light sources 1 are provided respectively in correspondence with the plurality of ball lenses 2. Each of the plurality of light sources 1 has a light emitting surface and outputs light toward a corresponding one of the plurality of ball lenses 2. The light emitting surface is located closer to the corresponding one of the plurality of ball lenses 2 than the focal point of the corresponding one of the plurality of ball lenses 2. Each of the plurality of ball lenses 2 may condense light from a corresponding one of the light sources 1, and may output the condensed light through the optical sheet layer 130 toward the liquid crystal display device 120. The plurality of ball lenses 2 and the plurality of light sources 1 may form a surface light source as a whole.

Note that it is possible to configure a display without using an optical modulator such as the liquid crystal display device 120. For example, a plurality of light sources 1 and a plurality of ball lenses 2 may be arranged in an array to allow a set of at least one of the plurality of light sources 1 and at least one of the plurality of ball lenses 2 to form one pixel. It is possible to display an image by adjusting the output intensity of light from the light source 1 pixel by pixel. In such a case, the optical sheet layer 130 may be omitted from the configuration.

The optical sheet layer 130 may include, for example, a light diffusion layer 131 and an optical film 132, thus making it possible to uniformize an in-plane luminance of illumination light from the plurality of ball lenses 2 and to improve light utilization efficiency through a retroreflective effect to be described later.

Figure 16:
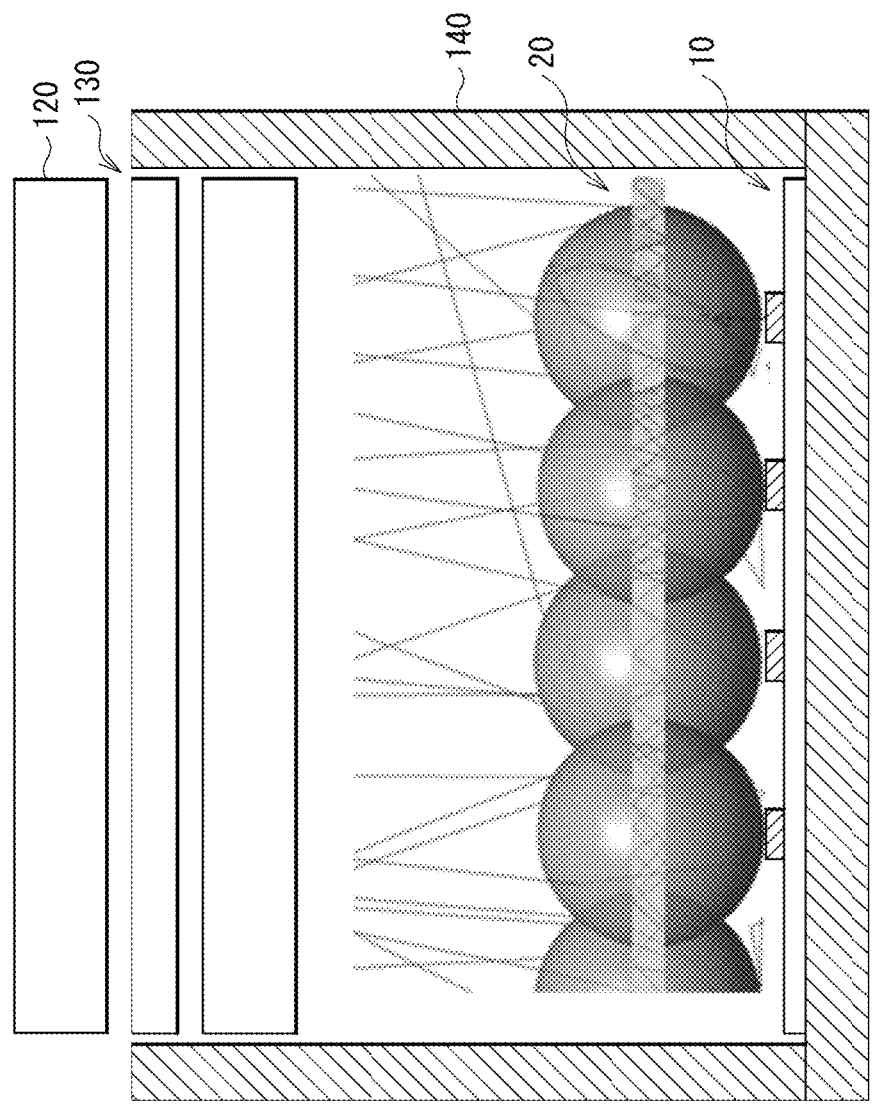
FIG. 16 is a cross-sectional diagram illustrating a second configuration example of the illumination apparatus and the display according to one embodiment.

FIG. 16 illustrates a second configuration example of the illumination apparatus and the display according to the first embodiment. In the display illustrated in FIG. 16, the illumination apparatus portion, which includes the light sources 1 and the ball lenses 2, may be contained in an optical box 140, in contrast to the configuration of the display illustrated in FIG. 15. The optical box 140 may be provided with the optical sheet layer 130 disposed on a light-outputting surface side of the ball lenses 2.

In the illumination apparatus and the display illustrated in each of FIGS. 15 and 16, the ball lenses 2 have a spherical shape, unlike attachment lenses that are typically used. This produces a retroreflective effect on light beams externally entering the ball lenses 2. As a result, when some light is reflected off the optical sheet layer 130 into return light toward the ball lenses 2, it is possible for the return light to enter the optical sheet layer 130 again. The light utilization efficiency is thereby improved.

Figure 17:
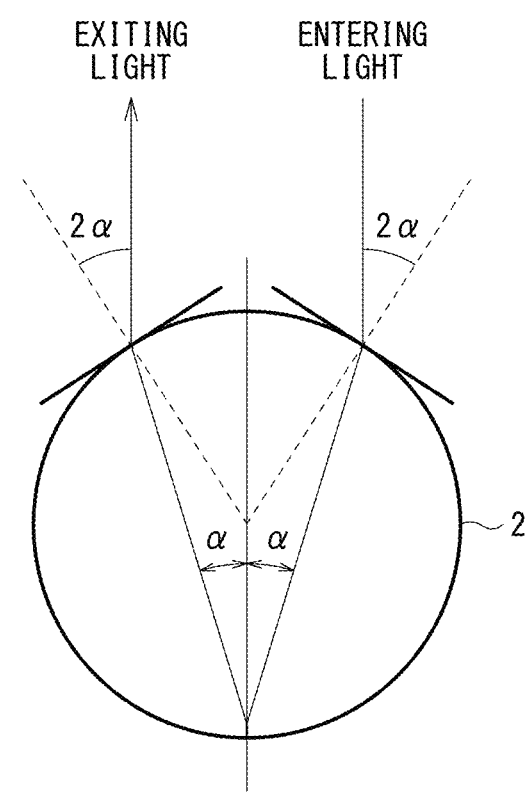
FIG. 17 is an explanatory diagram illustrating retroreflection in the ball lens.

A description will be given of retroreflection on the ball lens 2 with reference to FIG. 17. In general, it is known that light entering the ball lens 2 at an entry angle 2α is refracted at the surface, reflected inside the ball lens 2, then refracted again at the surface, and exits the ball lens 2. In this case, given that the entry angle is 2α, the exit angle is equal to 2α. This provides the ball lens 2 with a function of returning light in the direction in which the light has entered. This is referred to as retroreflection. Although it is ideal that light having entered in any direction be constantly returned in the direction in which the light has entered, there is some limitation in range. In the optical unit according to the first embodiment, the ball lens 2 exhibits the retroreflection property because of its spherical shape. Thus, return light reflected by the optical sheet layer and entering the ball lens 2 is outputted again in the direction of its entrance by total reflection from the ball lens 2.

Making effective use of the occurrence of the retroreflective effect enables improvement in light utilization efficiency. For example, if a light beam that has once been outputted from the ball lens 2 is assumed as primary light and light reflected by external components such as the optical sheet layer 130 is assumed as primary reflected light, there is a property that the primary reflected light is able to be reflected again by the ball lens 2 and be outputted as secondary light from the ball lens 2 at the same azimuth as the azimuth of entrance of the light. The reflections of the light are repeated n times until reflection light is exhausted. If such a cycle is referred to as a recycling effect, according to the first embodiment, the use of the ball lens 2 makes it possible to produce the recycling effect much more effectively than currently possible. By virtue of such a feature that is not achievable by existing lens systems, it is possible to increase final outputs of light beams and thereby improve light utilization efficiency.

Figure 18:
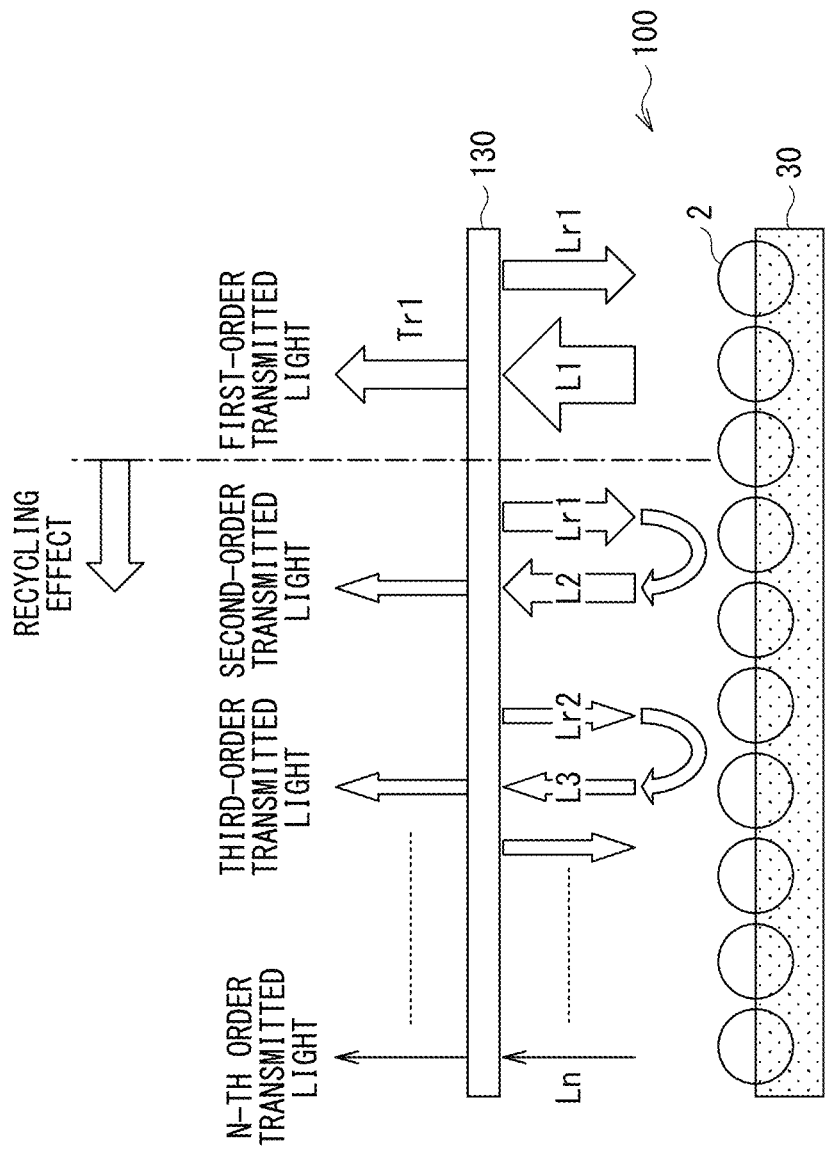
FIG. 18 is an explanatory diagram illustrating an overview of a recycling effect of light in a case where a diffusion sheet is used in an optical sheet layer in the optical unit according to one embodiment.

FIG. 18 illustrates an overview of a recycling effect of light in a case where a diffusion sheet is used in the optical sheet layer 130 in the optical unit according to the first embodiment.

FIG. 18 illustrates a configuration example in which the optical sheet layer 130 (a diffusion sheet) is disposed above a light source section 100. The light source section 100 may include a plate 30 and a plurality of arrayed ball lenses 2 disposed thereon. The plate 30 may be provided with walls that reflect light from the light sources 1 (not illustrated in FIG. 18) toward the ball lenses 2.

As a non-limiting example, White Optics (registered trademark) DF-90, a low-loss diffusion sheet for refractive lens systems available from WhiteOptics, LLC located in New Castle, DE, U.S.A., may be used as the optical sheet layer 130 (diffusion sheet). The diffusion sheet shall have a spectral transmittance Tr1 of a known, fixed value. A portion of first-order entering light L1 from the light source section 100 is allowed to exit from the diffusion sheet as first-order transmitted light based on the spectral transmittance Tr1, and another portion of the first-order entering light L1 is reflected by the diffusion sheet into first-order reflected return light Lr1. The first-order reflected return light Lr1 is reflected again by the light source section 100 and enters the diffusion sheet again as second-order entering light L2. A portion of the second-order entering light L2 from the light source section 100 is allowed to exit from the diffusion sheet as second-order transmitted light based on the spectral transmittance Tr1, and another portion of the second-order entering light L2 is reflected by the diffusion sheet into second-order reflected return light Lr2. Then, in like manner, the recycling process where a portion of n-th order entering light Ln is allowed to exit from the diffusion sheet as n-th order transmitted light based on the spectral transmittance Tr1 is repeated.

If a total luminous flux of the transmitted light during the foregoing recycling process is measured with an integrating sphere, the measurement value includes a combined total for all the outputted light beams resulting from the first to the n-th order transmitted light. If the sum total of luminous flux is compared between a case with the diffusion sheet and a case without the diffusion sheet, the spectral transmittance in the case with the diffusion sheet exhibits a higher measurement value due to the presence of the second to the n-th order transmitted light than in the case of measuring the first-order transmitted light alone. It is possible to estimate the degree of the recycling effect by using such a measurement method. The amount of increase in measurement value of the transmittance in the presence of the recycling effect is the sum total of the second to the n-th order transmitted light.

In general, it is extremely difficult to effectively re-condense dispersing light beams (exhibiting Lambertian light distribution). Features of the optical unit according to the first embodiment include the following.

1) The light source 1 (mainly an LED) is located closer to the ball lens 2 than the focal position of the ball lens 2. This configuration allows almost all light beams outputted from the light source 1 to be captured into the ball lens 2, even though the light beams exhibit Lambertian light distribution. As a result, it is possible to accomplish efficient light condensing without going through other stepwise light-condensing processes.

2) In a case where the light sources 1 are two-dimensionally arrayed in a plane, it is possible to produce a collimated light source of a planar shape by similarly arraying the ball lenses 2 in correspondence with the light sources 1.

3) The spherical shape of the ball lens 2 imparts a retroreflection property to the light emitting surface. This provides suitability for construction into a box structure.

1.2. Detailed Configuration Conditions and Workings

The optical unit according to the first embodiment exploits spherical aberration of the ball lens 2 for one purpose of obtaining an effective light condensing property. Although aberration is an undesirable characteristic in optical systems handling images, the optical unit according to the first embodiment exploits a basic property of the spherical aberration to improve the efficiency of capturing of light beams into the ball lens 2. In this connection, first, a description will be given of a typical property of spherical aberration.

Figure 19:
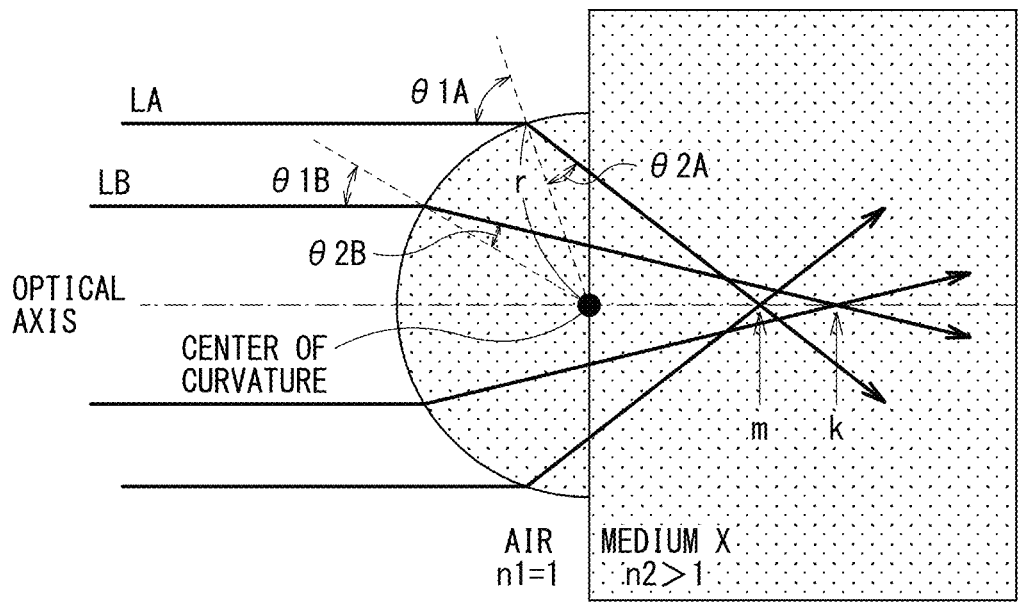
FIG. 19 is an explanatory diagram illustrating an overview of an occurrence of spherical aberration.
Figure 20:
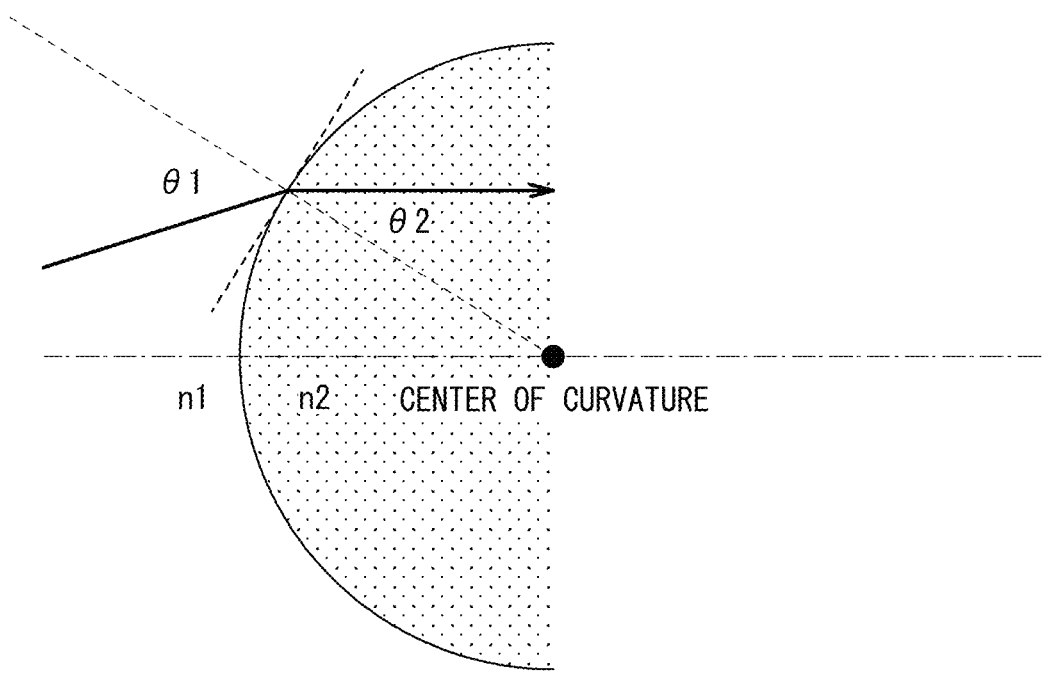
FIG. 20 is an explanatory diagram illustrating an overview of Snell's law on a spherical surface.

FIG. 19 illustrates an overview of the occurrence of spherical aberration. FIG. 20 illustrates an overview of Snell's law on a spherical surface.

FIG. 19 illustrates light beams LA and LB parallel to an optical axis entering a spherical refractive surface having a radius of curvature r. In this drawing, the light beams LA and LB are depicted as entering a medium X having a refractive index n2 greater than 1 from a medium (air) having a refractive index n1 equal to 1. Further, FIG. 19 depicts the light beam LA as being located farther from the optical axis than the light beam LB, and the light beam LB as being located closer to the optical axis than the light beam LA.

The light beams LA and LB enter an interface between air and the spherical medium X having the radius of curvature at entry angles θ1A and θ1B, respectively. In such a case, as illustrated in FIG. 19, the light beams LA and LB enter the medium X at the respective entry angles θ1A and θ1B different from each other.

Specifically, the entry angle θ1A of the light beam LA is relatively larger, and the entry angle θ1B of the light beam LB is relatively smaller. Here, as illustrated in FIG. 20, in a case where a light beam entering a medium having a refractive index n2 from a medium having a refractive index n1 at an entry angle θ1 is refracted at a refraction angle θ2, the following relationship holds in accordance with Snell's law: $n1 \sin θ1 = n2 \sin θ2$. In the case of FIG. 19, when the light beams LA and LB are refracted, Snell's law also holds true for the relationship among the refractive indices n1 and n2 (n1<n2) of the media, the entry angles θ1A and 61B, and refraction angles θ2A and θ2B. Therefore, the light beam LA having a greater entry angle is refracted more largely than the light beam LB. Because of the relationships of θ1A>θ1B and θ2A>θ2B, the light beam LA converges to a point m in front of a point k to which the light beam LB converges. The positional difference between the points of convergence is referred to as spherical aberration or on-axis aberration.

The on-axis aberration is greater in, for example, the ball lens 2 having a large curvature for use in the optical unit according to the first embodiment. This indicates that the ball lens 2 provides a large refraction amount for light beams, that is, has a high property of causing light being transmitted through a peripheral portion of the lens apart from the optical axis to converge to a position near the lens.

Figure 21:
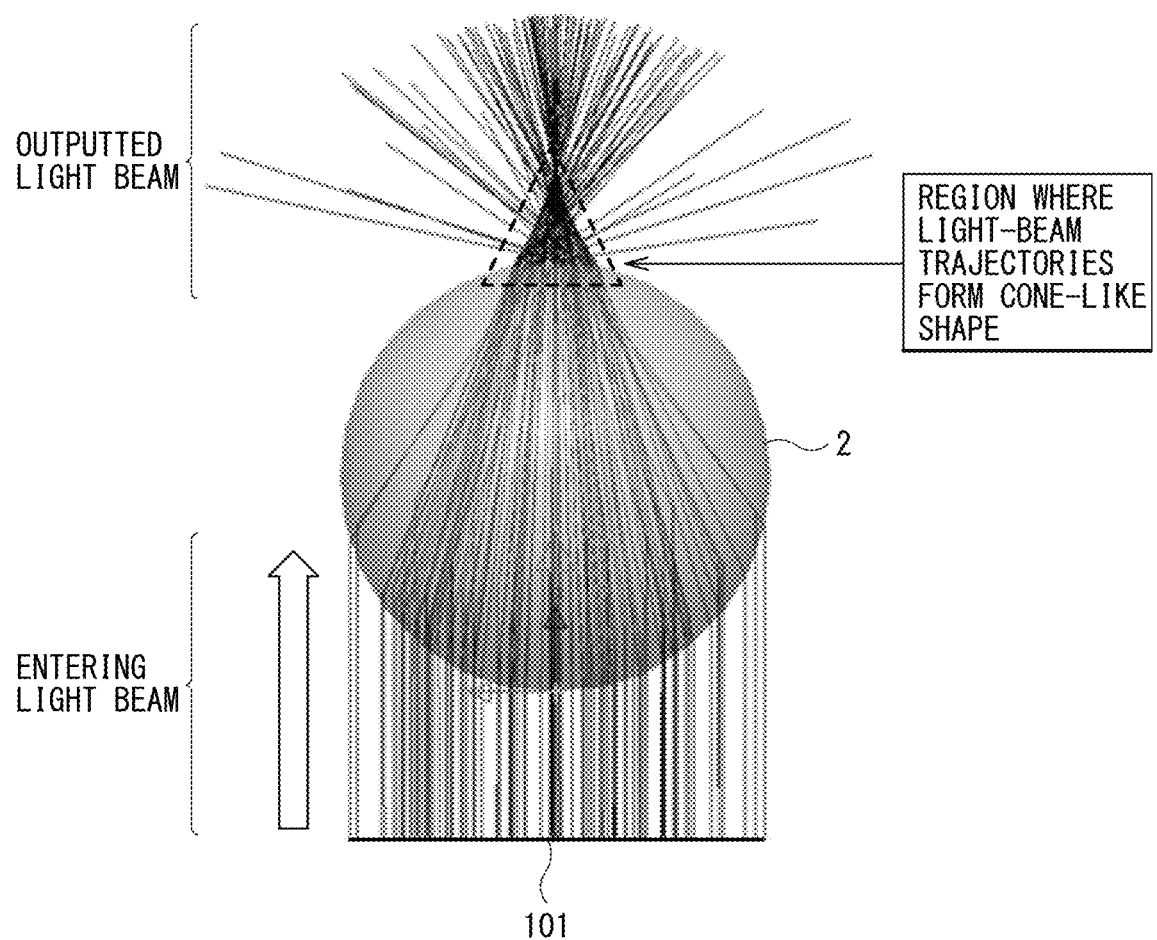
FIG. 21 is a side view diagram illustrating simulation results of trajectories of outputted light beams from the ball lens irradiated with parallel light.
Figure 22:
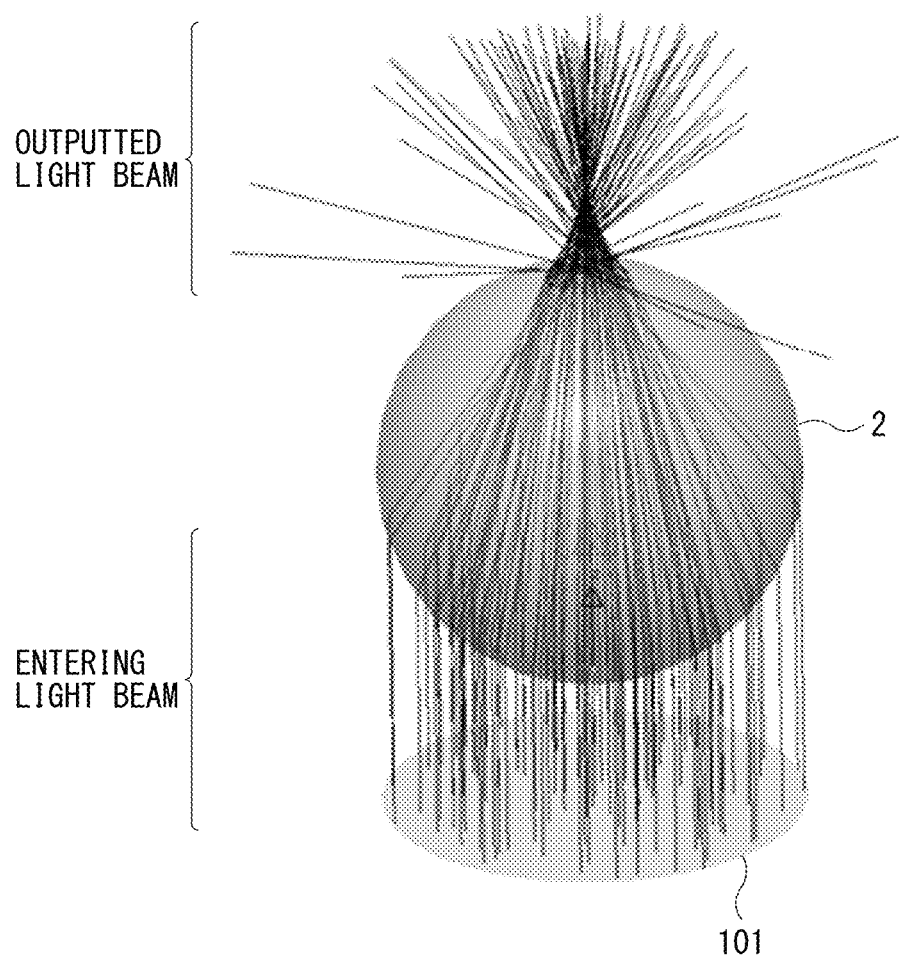
FIG. 22 is a top perspective view diagram illustrating the simulation results of trajectories of outputted light beams from the ball lens irradiated with parallel light.
Figure 23:
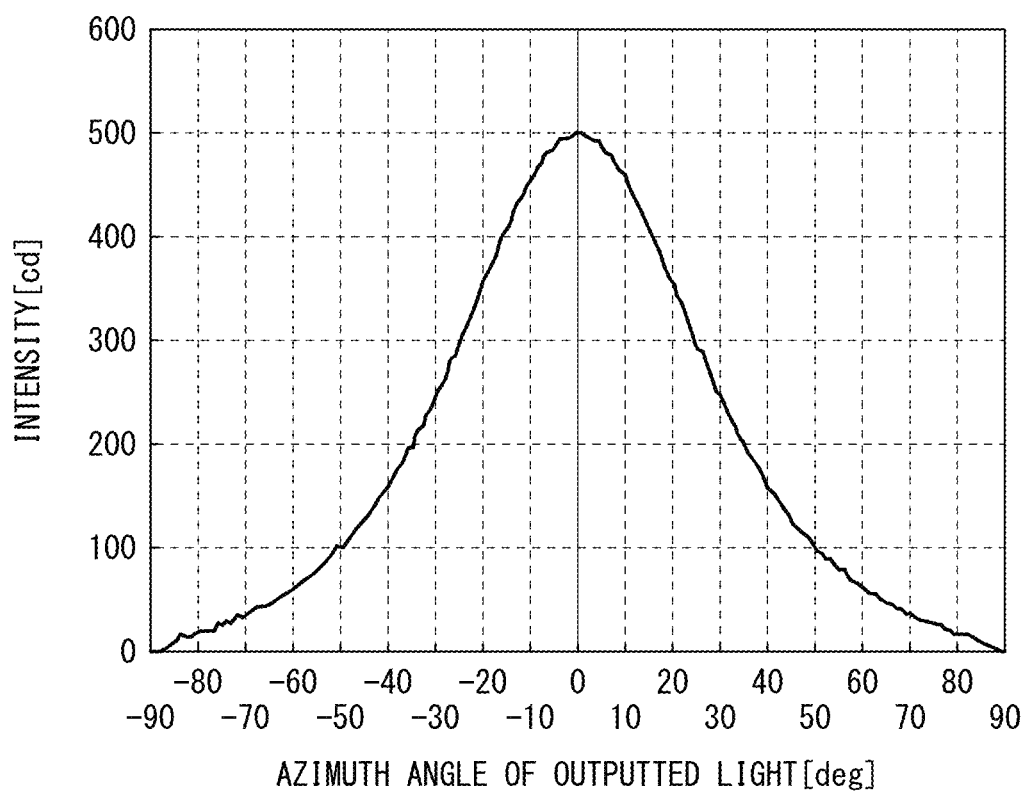
FIG. 23 is a characteristic diagram illustrating a simulation result of a light distribution characteristic of outputted light beams from the ball lens irradiated with parallel light.
Figure 24:
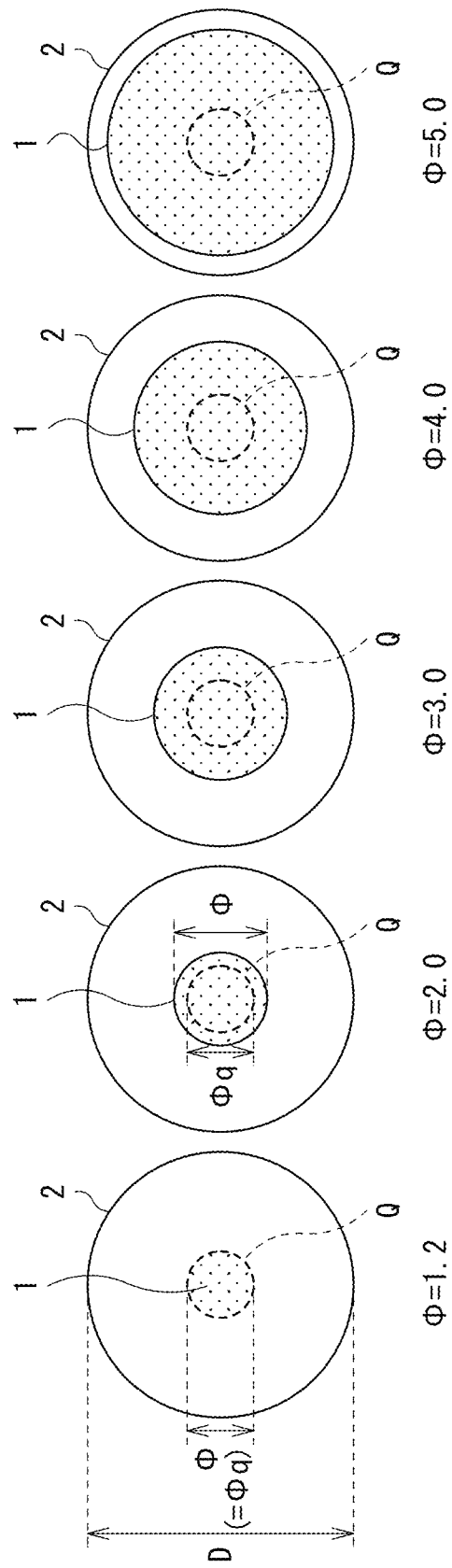
FIGS. 24A, 24B, 24C, 24D, and 24E are configuration diagrams illustrating a plurality of configuration examples for the optical unit according to one embodiment with varying light source diameters relative to a lens diameter of the ball lens.

FIGS. 21 and 22 illustrate simulation results of trajectories of outputted light beams from the ball lens 2 irradiated with parallel light. FIG. 21 is a side view. FIG. 22 is a top perspective view. FIG. 23 illustrates a simulation result of a light distribution characteristic of outputted light beams from the ball lens 2 irradiated with parallel light.

For the sake of explanation, FIGS. 21 to 23 illustrate the simulation results in a state where parallel light beams are caused to enter the ball lens 2 in a direction opposite to that in the case of use as the optical unit. Further, FIGS. 21 to 23 illustrate the simulation results in a state where parallel light beams from a virtual light source 101 having a circular light emitting region of the same diameter as the lens diameter D of the ball lens 2 is caused to enter the ball lens 2. The simulation used a radiation intensity of 1 W as a basis for calculations.

As seem from FIG. 23, even if parallel light beams enter the ball lens 2, the outputted light beams exhibit a distribution angle range of ±90 degrees at the maximum, indicating that it is possible to obtain a light distribution that spreads widely to the extent of bending at a right angle.

While FIG. 23 illustrates the results of investigating the property of creating a focal point by allowing parallel light to enter the ball lens 2, consideration will be made, from a perspective of retracing the light beam trajectories illustrated in FIGS. 21 and 22, as to collecting light by using the light source 1 (e.g., an LED) which produces a wide-range light distribution typified by Lambertian light distribution. In this case, it is suggested that with the ball lens 2, it may become possible for even a light beam emitted at a large angle from the light source 1 to enter the ball lens 2 at an extremely large refraction angle and be captured thereinto for utilization. The technology of the optical unit according to the first embodiment is made possible by taking advantage of the property of aberration described above.

Next, optimum configuration conditions in combining the ball lens 2 with the light source 1 such as an LED will be described.

What follows is the relationship between the lens diameter D and the light source diameter φ.

Definitions of the dimensions of the ball lens 2, etc. are as illustrated in FIGS. 14A and 14B described above. Because the ball lens 2 is spherical, once the lens diameter D and the refractive index n of the lens material have been determined, it is easy to determine and simplify other parameters such as focal length EFL, aperture ratio NA, etc. in like manner. As described above, subtracting the radius (D/2) of the ball lens 2 from the focal length EFL gives the back focus BFL.

In a case where parallel light is caused to enter the ball lens 2, the convergence point of the light transmitted through the ball lens 2 is not fixed to a single point because of the presence of spherical aberration as described above. In view of this, a description will be given on the assumption that there are a lot of light beams assembled into a group of light beams as a whole. In the case where parallel light is caused to enter the ball lens 2, an aggregate of trajectories of the group of light beams can be regarded as being concentrated in a range of a three-dimensional region shaped like a cone, as indicated by broken lines in FIG. 21, the maximum length of the back focus BFL being regarded as the height of the cone. Thus, for convenience in explanation, the region Q having the diameter ϕq as illustrated in FIG. 14B, which corresponds to the bottom surface of the cone, will be considered.

With attention focused on the diameter ϕq of the circular region Q forming the bottom surface of the conical region, the state of light condensing, etc. by the ball lens 2 was simulated for a case where the light source diameter ϕ of the light source 1 falls within the diameter ϕq of the circular region Q and a case where the light source diameter ϕ does not fall within the diameter ϕq. The results are illustrated in FIGS. 25, 26, 27A, 27B, 27C, 27D, 27E, and 28.

Figure 26:
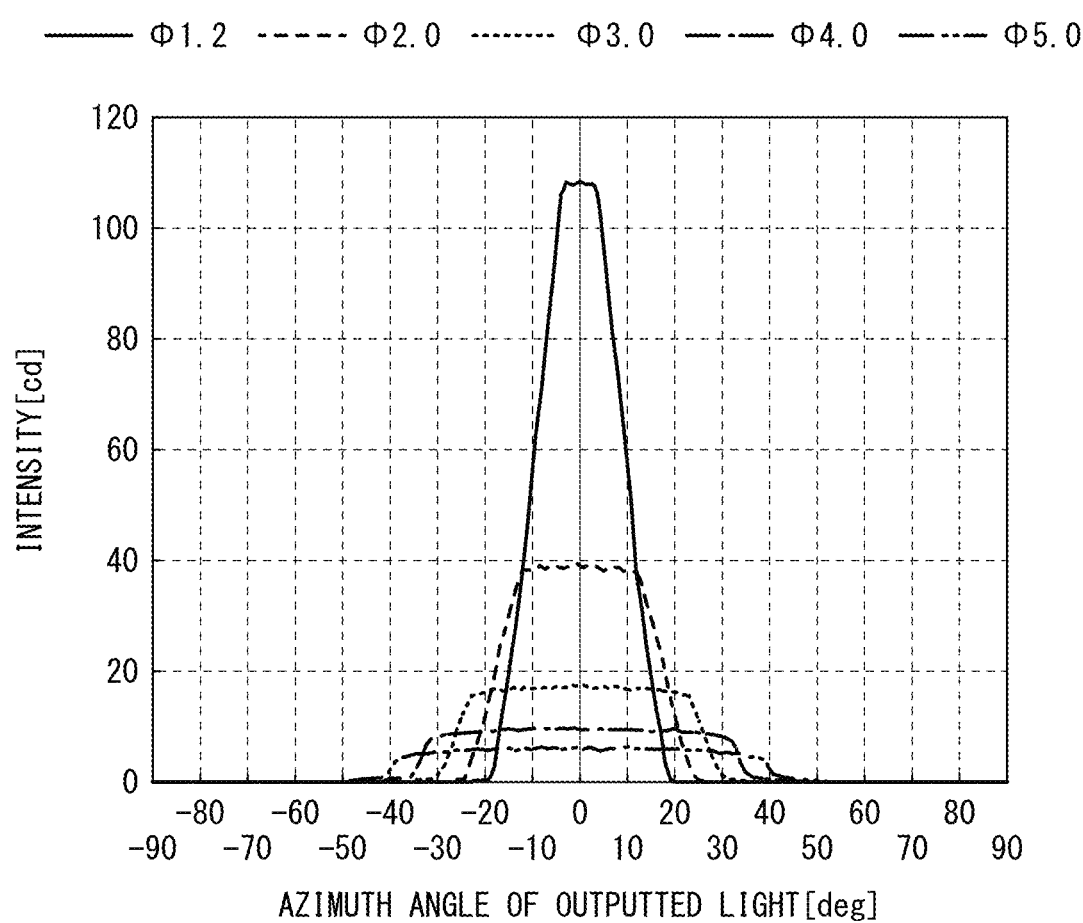
FIG. 26 is a characteristic diagram illustrating simulation results of light distribution characteristics of the optical unit according to one embodiment with varying light source diameters relative to the lens diameter of the ball lens.
Figure 27:
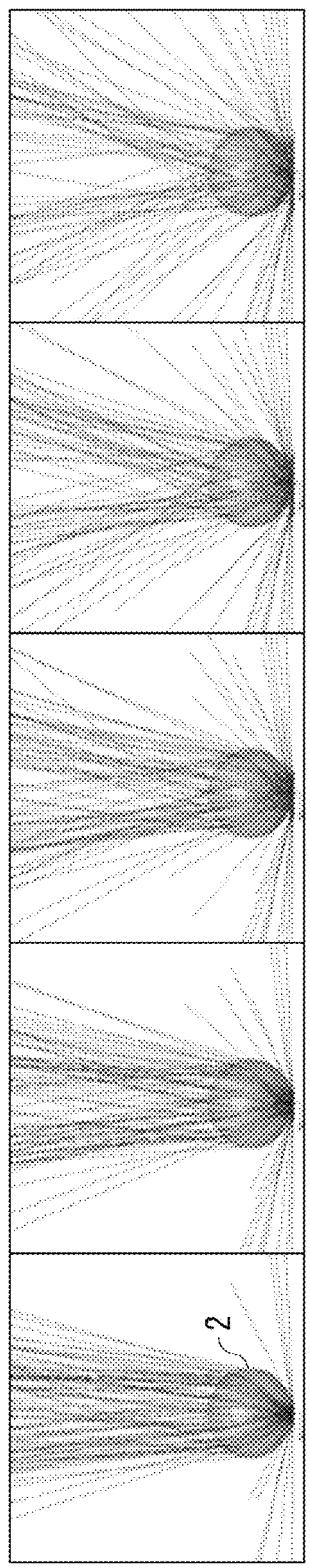
FIGS. 27A, 27B, 27C, 27D, and 27E are side view diagrams illustrating simulation results of trajectories of outputted light beams with varying light source diameters relative to the lens diameter of the ball lens in the optical unit according to one embodiment.
Figure 28:
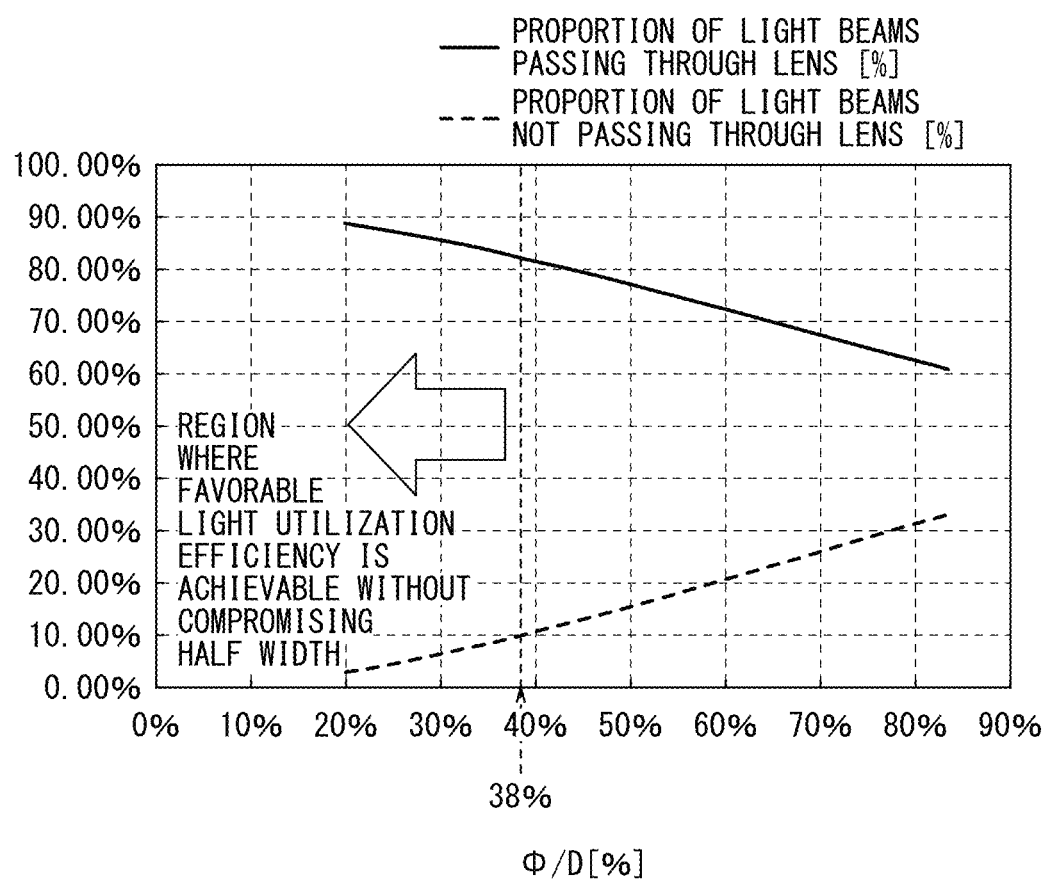
FIG. 28 is an explanatory diagram illustrating an influence of a relationship between the lens diameter and the light source diameter on light utilization efficiency in the optical unit according to one embodiment.

FIGS. 24A, 24B, 24C, 24D, and 24E illustrate a plurality of configuration examples for the optical unit according to the first embodiment with varying light source diameters ϕ relative to the lens diameter D of the ball lens 2 for the purpose of simulation. FIG. 25 illustrates the results of simulating optical characteristics of the optical unit according to the first embodiment with varying light source diameters ϕ relative to the lens diameter D of the ball lens 2. FIG. 26 illustrates the results of simulating light distribution characteristics of the optical unit according to the first embodiment with varying light source diameters ϕ relative to the lens diameter D of the ball lens 2. FIGS. 27A, 27B, 27C, 27D, and 27E illustrate the results of simulating trajectories of outputted light beams with varying light source diameters ϕ relative to the lens diameter D of the ball lens 2 in the optical unit according to the first embodiment. FIG. 28 illustrates an influence of the relationship between the lens diameter D and the light source diameter ϕ on light utilization efficiency in the optical unit according to the first embodiment. In FIG. 28, the horizontal axis represents ϕ/D (%), and the vertical axis represents the proportion of light beams (%). FIG. 28 illustrates the relationships of ϕ/D with the proportion of light beams passing through the ball lens 2 and the proportion of light beams not passing through the ball lens 2.

FIGS. 25, 26, 27A, 27B, 27C, 27D, 27E, and 28 illustrate the simulation results for a case where, as the light source 1, a surface light source of a circular plate shape with a light source diameter ϕ is provided to be in contact with the ball lens 2, as illustrated in FIGS. 24A, 24B, 24C, 24D, and 24E. FIGS. 25, 26, 27A, 27B, 27C, 27D, 27E, and 28 illustrate the simulation results for the plurality of configuration examples with varying light source diameters ϕ and a fixed lens diameter D of the ball lens 2, as illustrated in FIGS. 24A, 24B, 24C, 24D, and 24E. For the purpose of simulation, Lambertian light beams were uniformly outputted from the entire light emitting surface of the light source 1, i.e., the surface light source of a circular plate shape, toward the ball lens 2. For comparison with the light source diameter ϕ of the light source 1, FIGS. 24A, 24B, 24C, 24D, and 24E also illustrate the explanatory circular region Q illustrated in FIG. 14B described above.

FIG. 25 illustrates the simulation results of relationships among, as the optical characteristics, the value of the light source diameter ϕ [mm], the ratio (ϕ/D) [%] of the light source diameter ϕ to the lens diameter D, the proportion [%] of light beams passing through the lens (the ball lens 2), the proportion [%] of light beams not passing through the lens (the ball lens 2), and a half width [deg] of outputted light beam from the ball lens 2. Note that in FIG. 25 the "proportion of light beams not passing through the lens" does not include any components that are, for example, absorbed inside the ball lens 2, but substantially represents the proportion of light beams not entering the ball lens 2. The same applies to other drawings illustrating simulation results to be referred to later.

As illustrated in FIG. 25, in a case where the ratio (ϕ/D) of the light source diameter ϕ to the lens diameter D is 20%, which corresponds to that in the above-described region Q, a half width of 10 degrees is obtained, and almost 90% of the light beams emitted from the light source 1 are outputted from the ball lens 2, indicating a high light utilization efficiency. Furthermore, from the simulation results illustrated in FIGS. 25, 26, 27A, 27B, 27C, 27D, 27E, and 28, it is seen that the half width is adjustable by adjusting the light source diameter ϕ on the basis of a target degree of light condensing.

Figure 29:
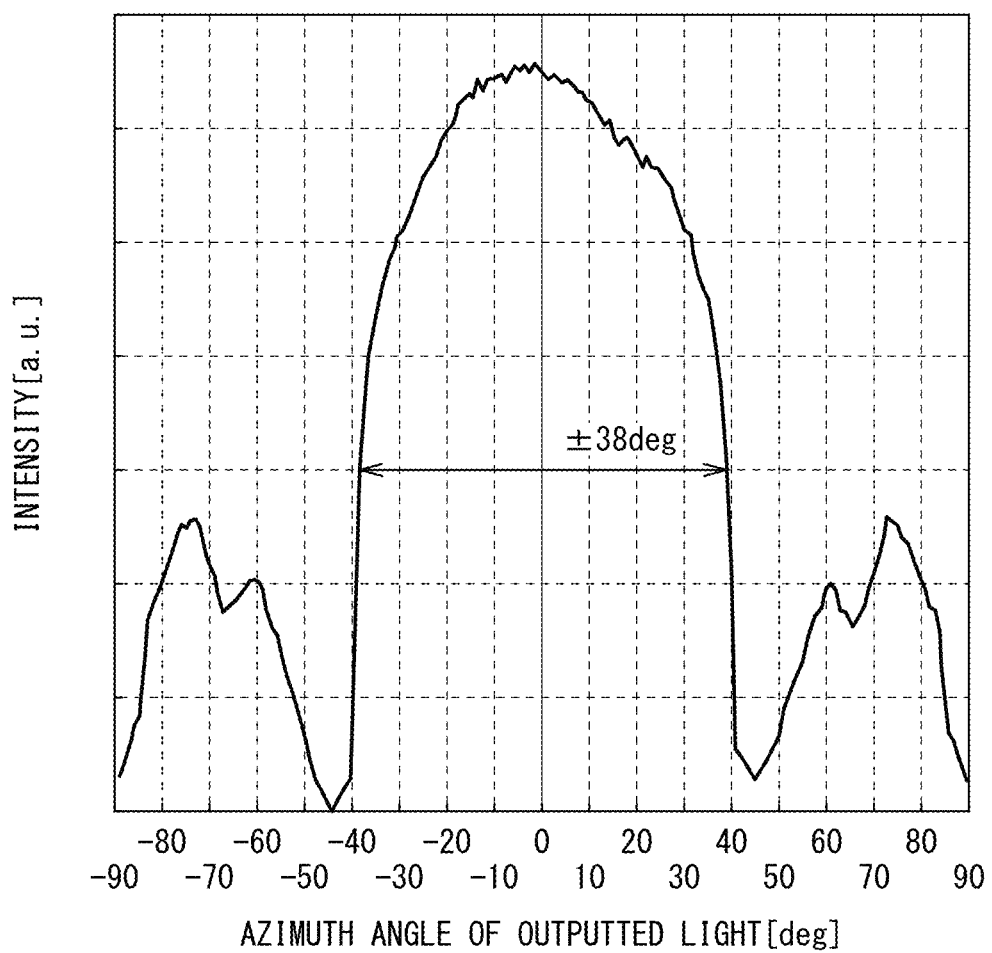
FIG. 29 is a characteristic diagram illustrating a light distribution characteristic of an optical unit according to a comparative example using an optical sheet.
Figure 30:
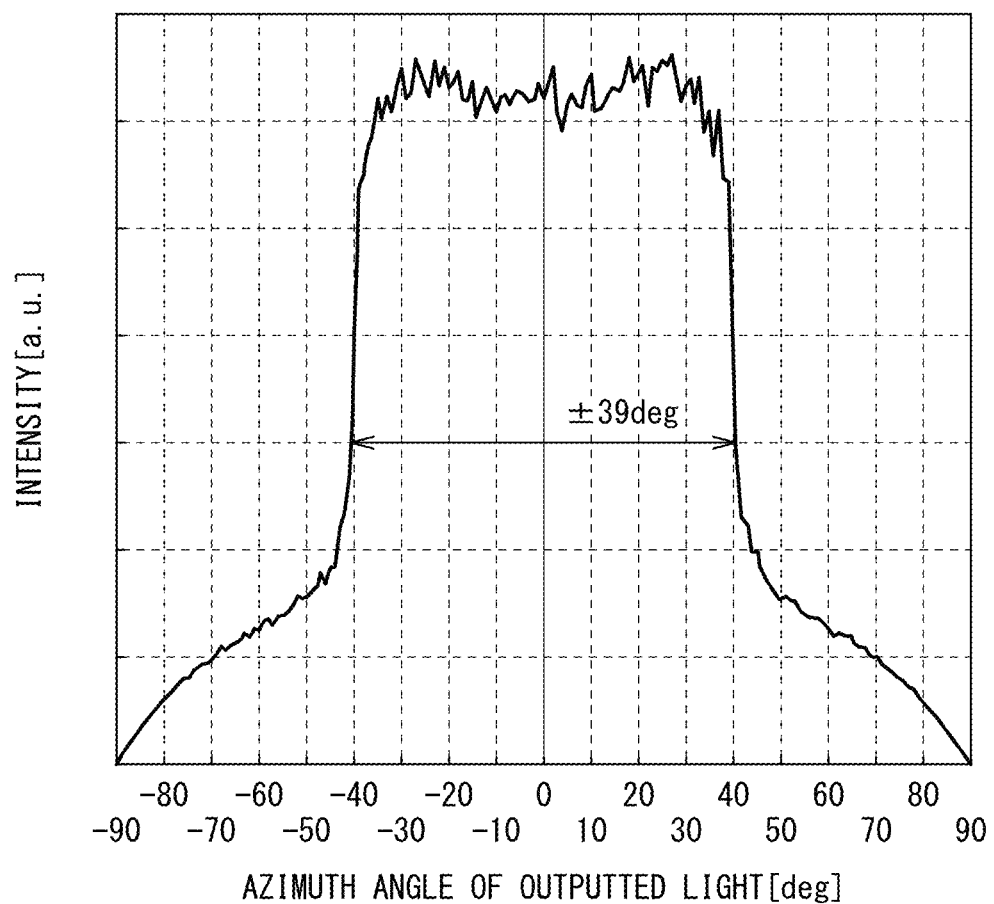
FIG. 30 is a characteristic diagram illustrating an example in which a light distribution characteristic close to that illustrated in FIG. 29 is achieved with the optical unit according to one embodiment.

FIG. 29 illustrates an example of a light distribution characteristic of an optical unit according to a comparative example that uses an optical sheet. FIG. 30 illustrates an example in which a light distribution characteristic close to that illustrated in FIG. 29 is achieved by the optical unit according to the first embodiment.

The example light distribution characteristic illustrated in FIG. 29 is one obtained with a configuration in which two stacked optical sheets are used instead of the ball lens 2, the optical sheets each including a prism sheet for enhancing luminance. The light distribution characteristic exhibits a half width on the order of ±38 degrees. FIG. 30 indicates that when ϕ/D=83%, a half width on the order of ±39 degrees, that is, a light distribution characteristic close to that illustrated in FIG. 29, is achieved. It is thus seen that ϕ/D of 83% or less results in better light condensing performance than that illustrated in FIG. 29 obtained with the optical unit according to the comparative example using the optical sheets.

The simulation results illustrated in FIGS. 25, 26, 27A, 27B, 27C, 27D, 27E, and 28 indicate that as the light source diameter ϕ becomes larger than the diameter ϕq of the region Q, the light condensing efficiency decreases and the half width increases. Further, as the light source diameter ϕ becomes larger than the diameter ϕq of the region Q, the proportion of light beams entering a peripheral portion of the ball lens 2 increases and therefore, as described in relation to the foregoing principle of spherical aberration, light beams large in refraction angle increase. This results in a wider distribution of light beams, and accordingly, a greater half width. These results can also be observed from the trajectories of light beams illustrated in FIGS. 27A, 27B, 27C, 27D, and 27E.

The foregoing description has dealt with an example in which the light emitting surface of the light source 1 is circular; however, actual LED elements often have a rectangular light emitting surface. A description will thus be given of characteristics in the case where the light source 1 has a rectangular light emitting surface.

Figures 31A, 31B, 32:
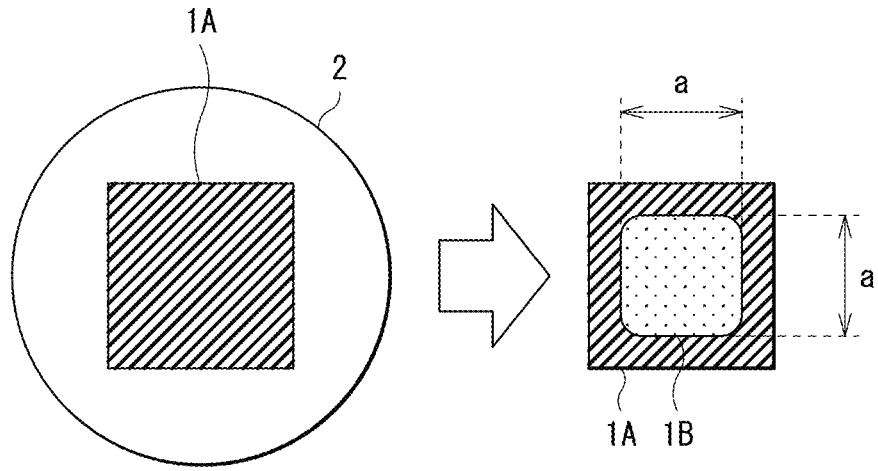
FIGS. 31A and 31B are configuration diagrams illustrating a configuration example in which the light source has a substantially square-shaped light emitting surface in the optical unit according to one embodiment.
FIG. 32 is an explanatory diagram illustrating simulation results of optical characteristics of the configuration example of FIGS. 31A and 31B.
Figure 33:
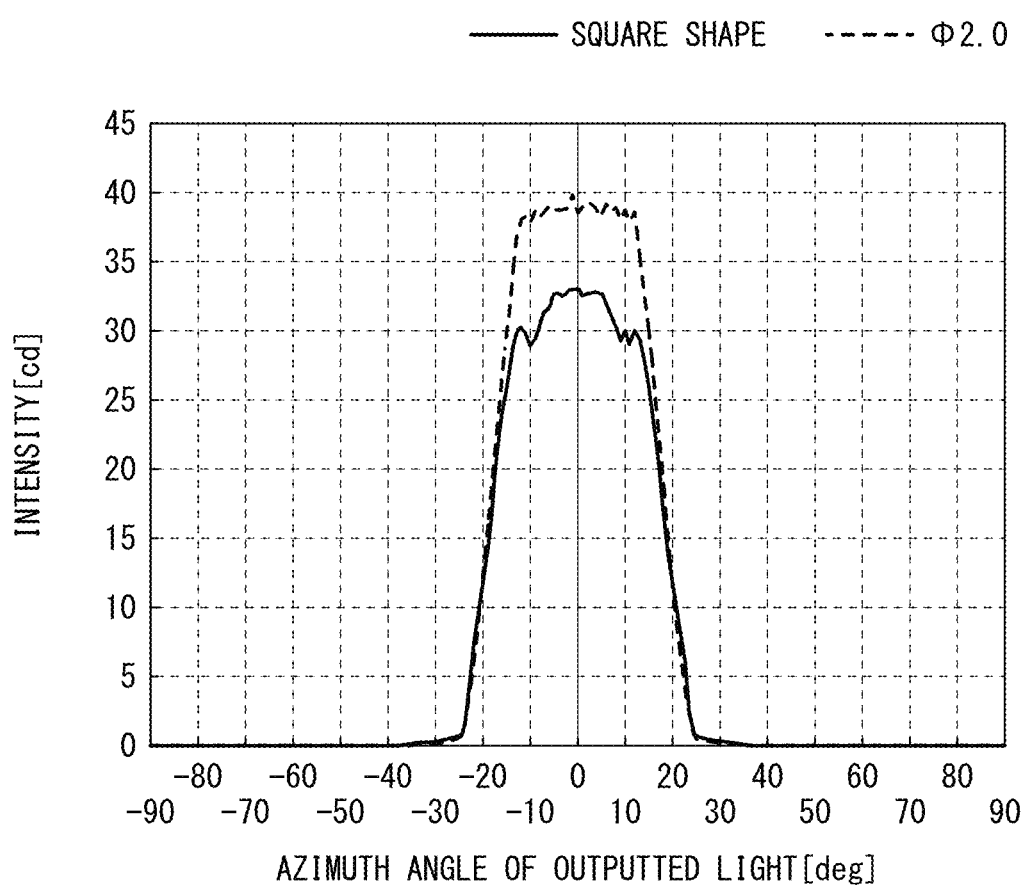
FIG. 33 is a characteristic diagram illustrating a simulation result of a light distribution characteristic of the configuration example of FIGS. 31A and 31B.

FIGS. 31A and 31B illustrate a configuration example in which a light source 1A having a substantially square-shaped light emitting surface, such as an LED package, is provided instead of the light source 1 having a circular light emitting surface in the optical unit according to the first embodiment. FIG. 32 illustrates simulation results of optical characteristics of the configuration example of FIGS. 31A and 31B. FIG. 33 illustrates a simulation result of a light distribution characteristic of the configuration example of FIGS. 31A and 31B. FIG. 33 also illustrates a light distribution characteristic of the light source 1 of a circular shape with a light source diameter φ of 2.0, as a comparative example.

FIGS. 31A and 31B illustrate an example where the light source 1A is packaged into an LED package having an intensive phosphor-emission region (a substantial light emitting region) 1B of a substantially square shape with a side length a. In this case, if the light emitting area $a^2$ is converted into a circle having an equivalent area, the circle has a radius r equal to $a/\sqrt{\pi}$, from the relationship that $a^2=\pi r^2$.

For the case illustrated in FIG. 32, given that a=2 mm, r is calculated as follows: $r=2/\sqrt{3.14}\approx1.128379167$. Therefore, if the light source 1A of a substantially square shape is converted into the light source 1 of a circular shape, the light source diameter φ is 2.25675833 corresponding to 2r. In this case, φ/D is approximately 38%, and the light beam utilization rate is almost 80%, which indicates that a considerably favorable light condensing performance is obtained as compared with, for example, the case with the optical unit according to the comparative example illustrated in FIG. 29 above, which uses optical sheets.

An explanation of the distance between the light source 1 and the ball lens 2 follows. In the above-described manner, a suitable dimension ratio φ/D between the light source diameter φ of the light source 1 and the lens diameter D of the ball lens 2 for obtaining predetermined light utilization efficiency and degree of light condensing is determined. Then, once the lens diameter D of the ball lens 2 has been determined, a plurality of ball lenses 2 may be arrayed and arranged in a plane. As a non-limiting example, the plurality of ball lenses 2 may be arrayed and arranged into a configuration in which, as illustrated in FIG. 10, three adjacent ball lenses 2 are disposed at the vertex positions of a virtual, substantially equilateral triangle.

In a case of also arraying and arranging a plurality of light sources 1 in the plane similarly, the density of arrangement and relative positions of the light sources 1 may be determined to correspond to the ball lenses 2. Therefore, in a case of arraying and arranging the ball lenses 2 in high density with a smaller lens diameter D, it is necessary to design the light source 1 into a suitable light source diameter φ accordingly. Furthermore, it is necessary to design an optimum value of the distance ΔL between the light emitting surface of the light source 1 and the ball lens 2.

In the optical unit according to the first embodiment, for emission of light beams, the light source 1 is disposed in close proximity to the ball lens 2 to be nearly in contact with the ball lens 2. More specifically, in one example embodiment, in a case where the ball lens 2 has a lens diameter D of 6 mm, the light source 1 is disposed not to be largely deviate from a nearby position that is directly below the ball lens 2 and is at a distance of a little under approximately 200 microns from the ball lens 2. In one example embodiment, ΔL/D may be 3.5% or less. This is based on the simulation results illustrated in FIGS. 34 to 36.

Figure 35:
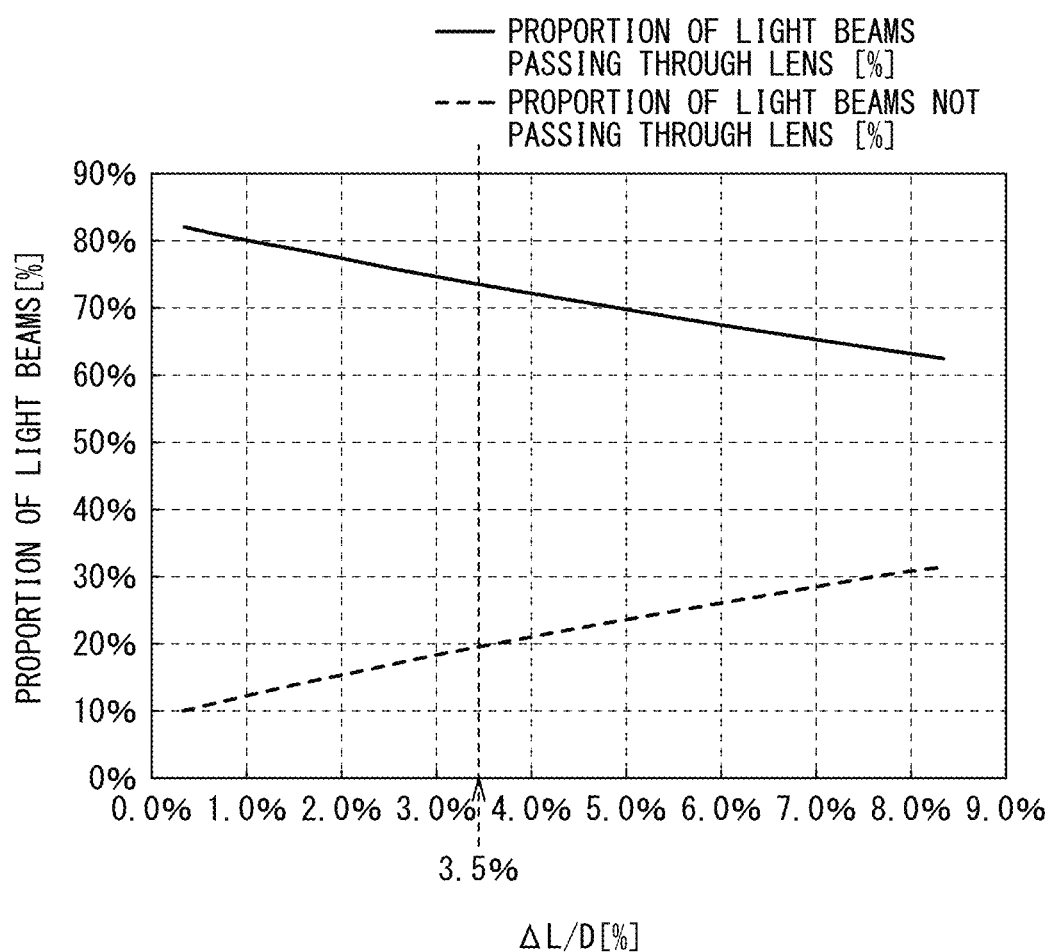
FIG. 35 is a characteristic diagram illustrating simulation results of relationships of a ratio of the distance between the light emitting surface of the light source and the ball lens to the lens diameter of the ball lens with a proportion of light beams passing through the lens and a proportion of light beams not passing through the lens in the optical unit according to one embodiment.
Figure 36:
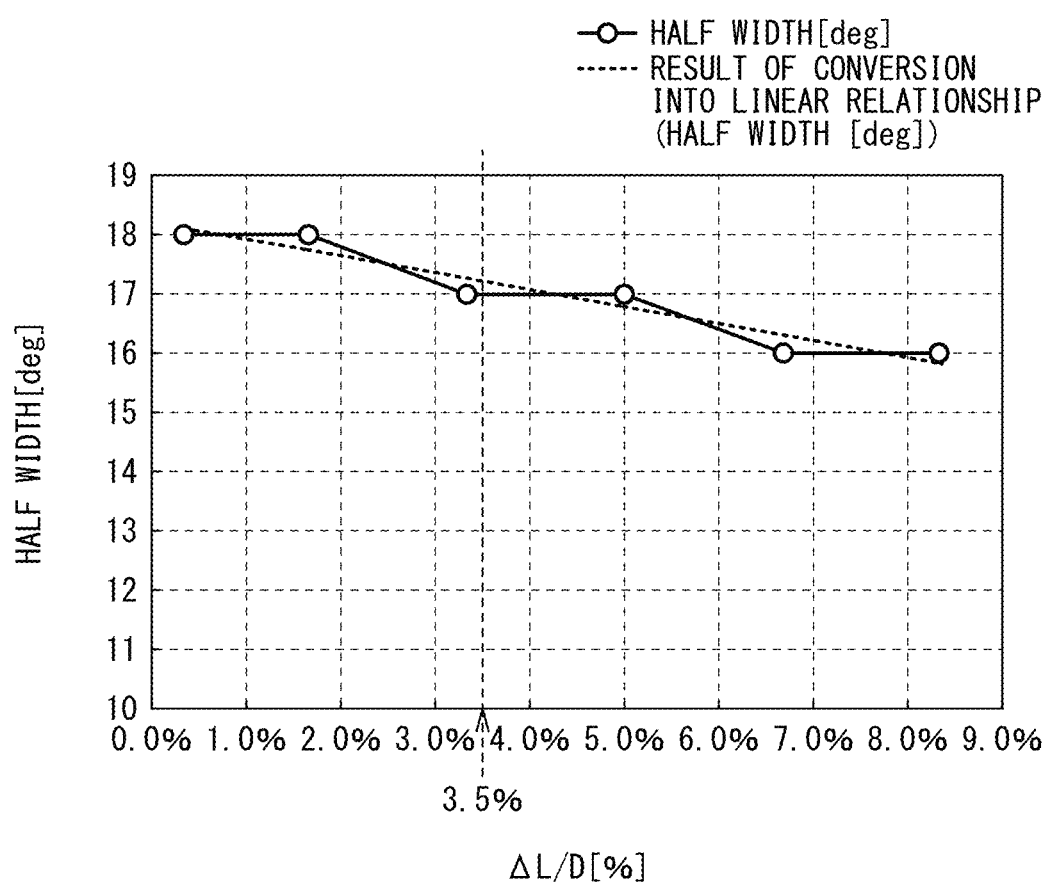
FIG. 36 is a characteristic diagram illustrating a simulation result of a relationship of the ratio of the distance between the light emitting surface of the light source and the ball lens to the lens diameter of the ball lens with a half width in the optical unit according to one embodiment.

FIG. 34 illustrates simulation results of optical characteristics of the optical unit according to the first embodiment with varying distances ΔL between the light emitting surface of the light source 1 and the ball lens 2. FIG. 35 illustrates simulation results of relationships of the ratio of the distance ΔL to the lens diameter D of the ball lens 2 with the proportion of light beams passing through the ball lens 2 and the proportion of light beams not passing through the ball lens 2 in the optical unit according to the first embodiment. FIG. 36 illustrates a simulation result of a relationship of the ratio of the distance ΔL to the lens diameter D of the ball lens 2 with the half width in the optical unit according to the first embodiment.

As described above, ΔL/D may be 3.5% or less in one example embodiment. A reason for this will now be described. FIG. 34 illustrates the optical characteristics in a case where φ/D is fixed at 38%. FIG. 34 illustrates simulation results of relationships among, as the optical characteristics, the distance ΔL [μm] between the light emitting surface of the light source 1 and the ball lens 2, the ratio (ΔL/D) [%] of the distance ΔL to the lens diameter D, the proportion [%] of light beams passing through the lens (the ball lens 2), the proportion [%] of light beams not passing through the lens (the ball lens 2), and the half width [deg] of light beams outputted from the ball lens 2. In FIG. 35, the horizontal axis represents ΔL/D [%], and the vertical axis represents the proportion of light beams [%]. FIG. 36 also illustrates a result of converting the relationship between ΔL/D and the half width to a linear relationship on the basis of the simulation results.

The simulation results illustrated in FIG. 35 indicate that it is desirable in terms of efficiency that ΔL/D be approximately 3.5% or less. Furthermore, the simulation results illustrated in FIG. 35 indicate that the degree of influence of a variation in the distance ΔL on the half width is much lower than that of a variation in the light source diameter φ. A variation in ΔL/D by 1% results in (ΔWH)/(ΔL/D) being approximately −0.28 [deg/%], where ΔWH represents half width. If the optical unit is used with the ratio ΔL/D of the distance ΔL to the lens diameter D of the ball lens 2 beyond 3.5%, the proportion of light beams not entering the ball lens 2 increases, which results in an increase in the proportion of light beams that fail to be targets of intended condensing.

In summary, conditions that make it possible to achieve light condensing efficiency of almost 90% and a half width of 10 degrees or less includes a first condition that, assuming that the light emitting region of the light source 1 as being circular in shape with a light source diameter φ, the ratio φ/D be 20% or less.

Furthermore, as a practical range based on the foregoing, the range of φ/D<38%, within which it is possible to achieve light condensing efficiency of 80% and a half width of 15 to 18 degrees, is employable as a second condition in terms of usable range.

The half width becomes wider with increasing light source diameter φ. For applications in which a half width of 30 degrees or less is sufficient, φ/D may be increased up to 50%. A range beyond this results in increased losses, and is thus generally no longer regarded as a practical range.

However, by providing not only the ball lens 2 but also the wall 3 whose inner surface (wall face) functions as the reflection surface 4 as illustrated in FIG. 16 described above, there may be cases where practical use is possible even if the above-described conditions are not met.

Figure 38:
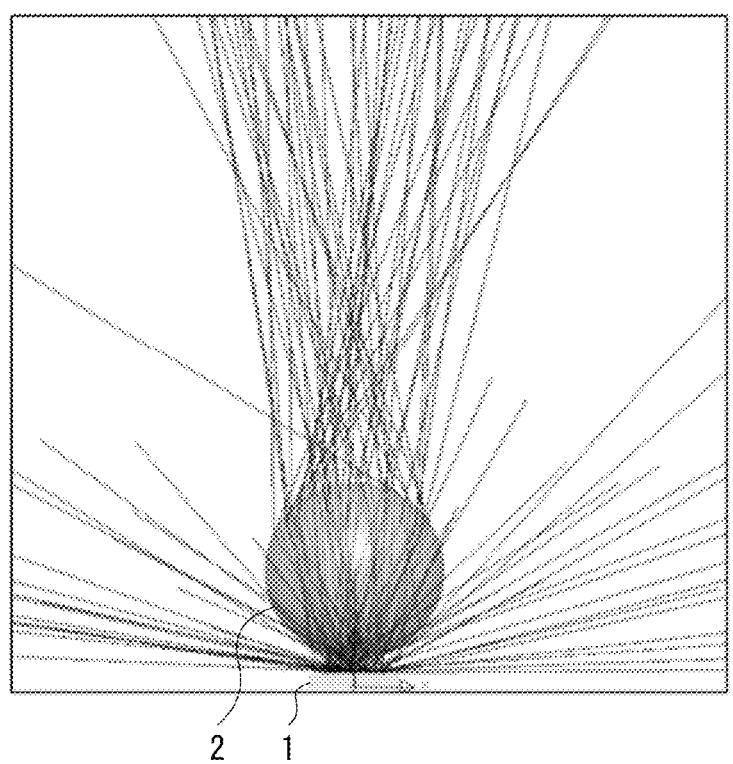
FIG. 38 is a side view diagram illustrating simulation results of trajectories of outputted light beams in the absence of the wall in the optical unit according to one embodiment.
Figure 39:
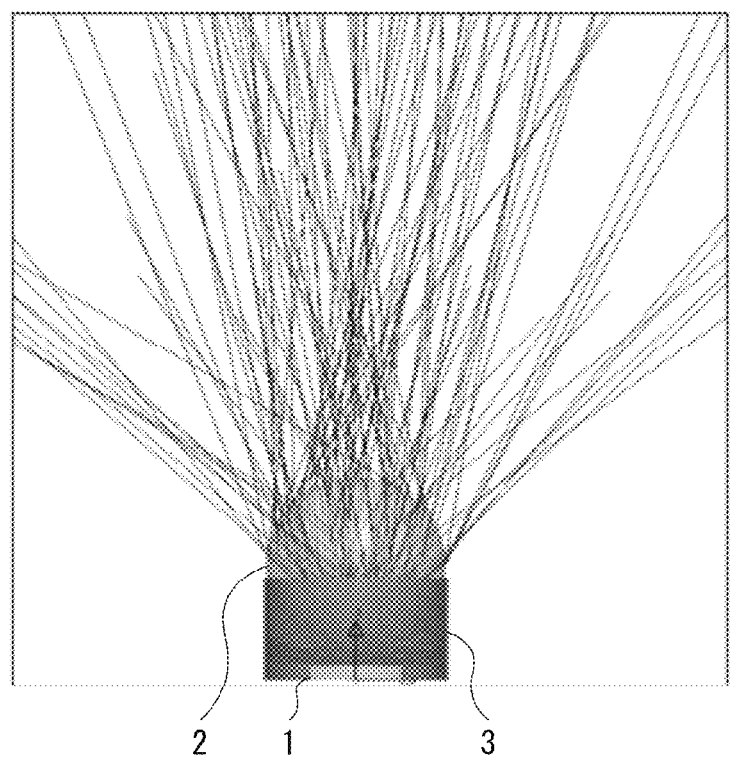
FIG. 39 is a side view diagram illustrating simulation results of trajectories of outputted light beams in the presence of the wall in the optical unit according to one embodiment.
Figure 40:
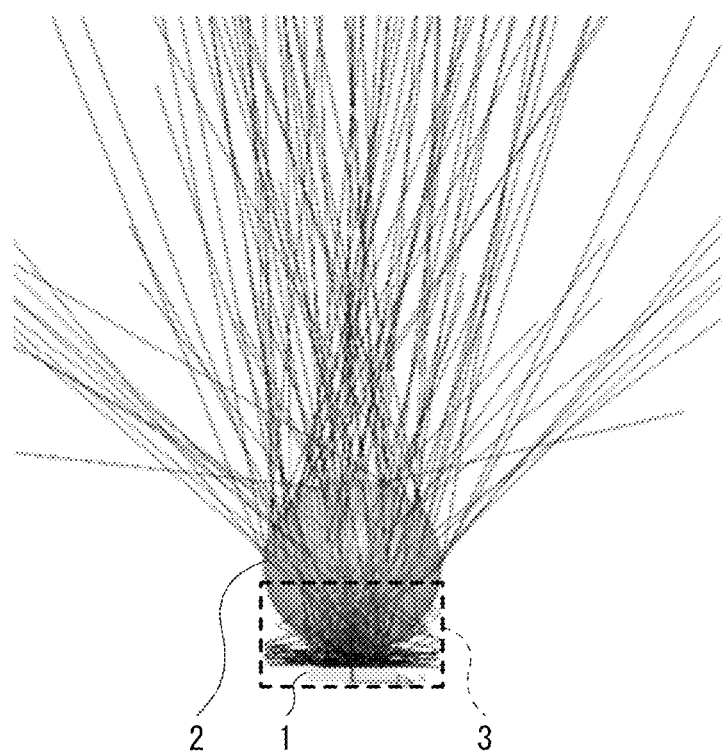
FIG. 40 is a side view diagram illustrating the simulation results of trajectories of the outputted light beams in the presence of the wall in the optical unit according to one embodiment, depicting the wall as transparent.
Figure 41:
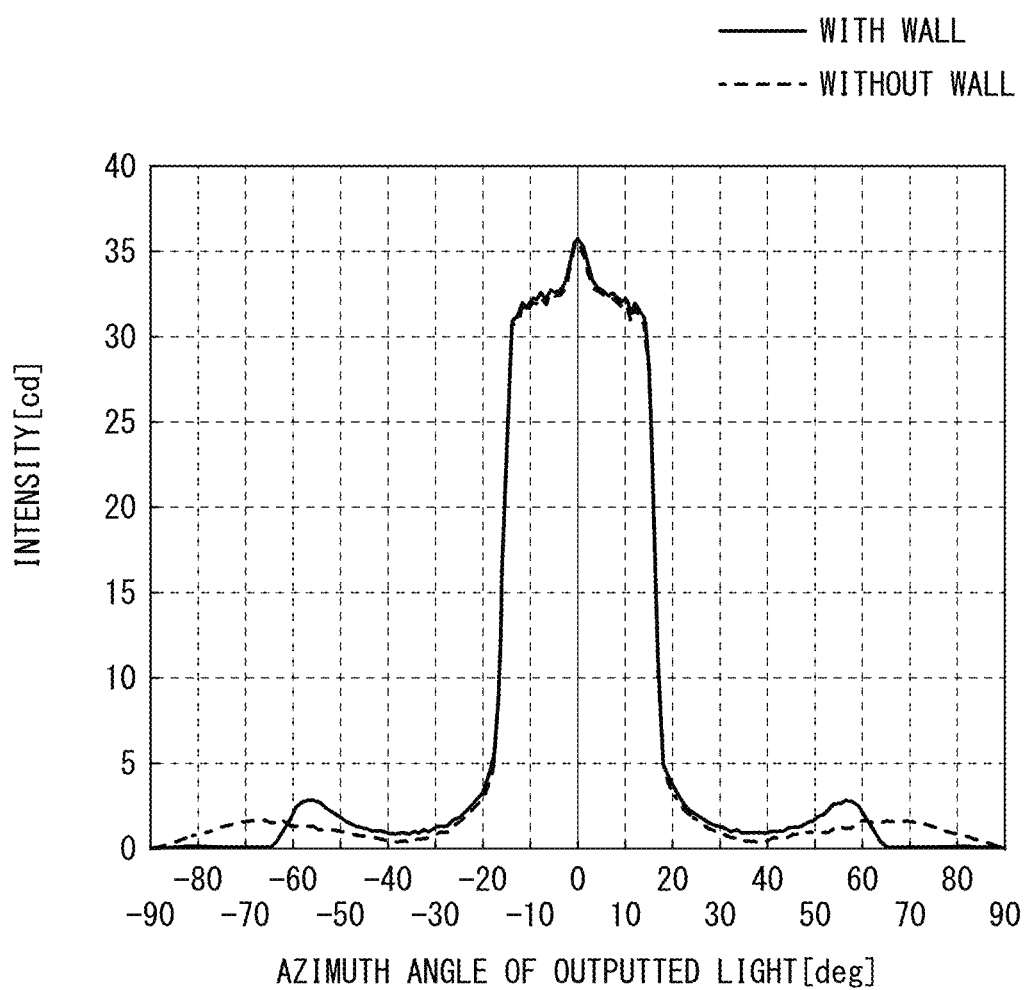
FIG. 41 is a characteristic diagram illustrating simulation results of light distribution characteristics of outputted light beams in the presence and absence of the wall in the optical unit according to one embodiment.

An explanation of characteristics in the presence of the wall 3 for reflecting a light beam from the light source 1 toward the ball lens 2 follows. FIG. 37 illustrates simulation results of optical characteristics of the optical unit according to the first embodiment in the presence and absence of the wall 3 reflecting light beams from the light source 1 toward the ball lens 2. FIG. 38 illustrates simulation results of trajectories of outputted light beams in the absence of the wall 3 in the optical unit according to the first embodiment. FIG. 39 illustrates simulation results of trajectories of outputted light beams in the presence of the wall 3 in the optical unit according to the first embodiment. FIG. 40 illustrates the simulation results of trajectories of the outputted light beams in the presence of the wall 3 in the optical unit according to the first embodiment, depicting the wall 3 as transparent. FIG. 41 illustrates simulation results of light distribution characteristics of outputted light beams in the presence and absence of the wall 3 in the optical unit according to the first embodiment.

FIG. 37 illustrates the results of simulating the relationships among, as the optical characteristics, the distance ΔL [μm] between the light emitting surface of the light source 1 and the ball lens 2, the ratio (ΔL/D) [%] of the distance ΔL to the lens diameter D, the proportion [%] of light beams passing through the lens (the ball lens 2), the proportion [%] of light beams not passing through the lens (the ball lens 2), and the half width [deg] of outputted light from the ball lens 2 in the presence of the wall 3 and in the absence of the wall 3.

As illustrated in FIG. 37, providing the wall 3 increases light beams that are capturable into the ball lens 2, making it possible to capture almost all the light beams. One reason for this is that, as illustrated in FIGS. 38 to 40, light beams that are not capturable into the ball lens 2 are reflected off the reflection surface 4 of the wall 3 to enter the ball lens 2. In the case where the wall 3 is not provided, as illustrated in FIGS. 38 and 41, azimuth angle of the light beams outputted from the ball lens 2 increases because the light beams from the light source 1 spread in lateral directions. From FIG. 41, it is seen that providing the wall 3 produces an effect of regulating the azimuth angle of outputted light beams to some extent. This example indicates that adding a process to aid in capturing light beams into the ball lens 2 is effective in reducing stray light.

Figure 42:
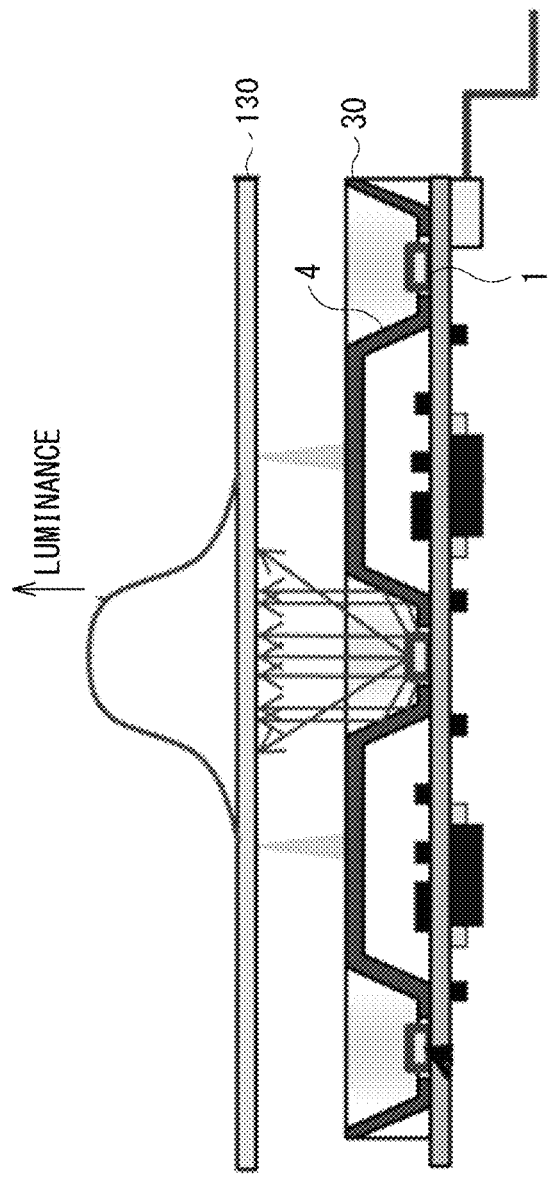
FIG. 42 is a cross-sectional diagram illustrating an example of an optical unit according to a comparative example provided with arrayed walls.
Figure 43:
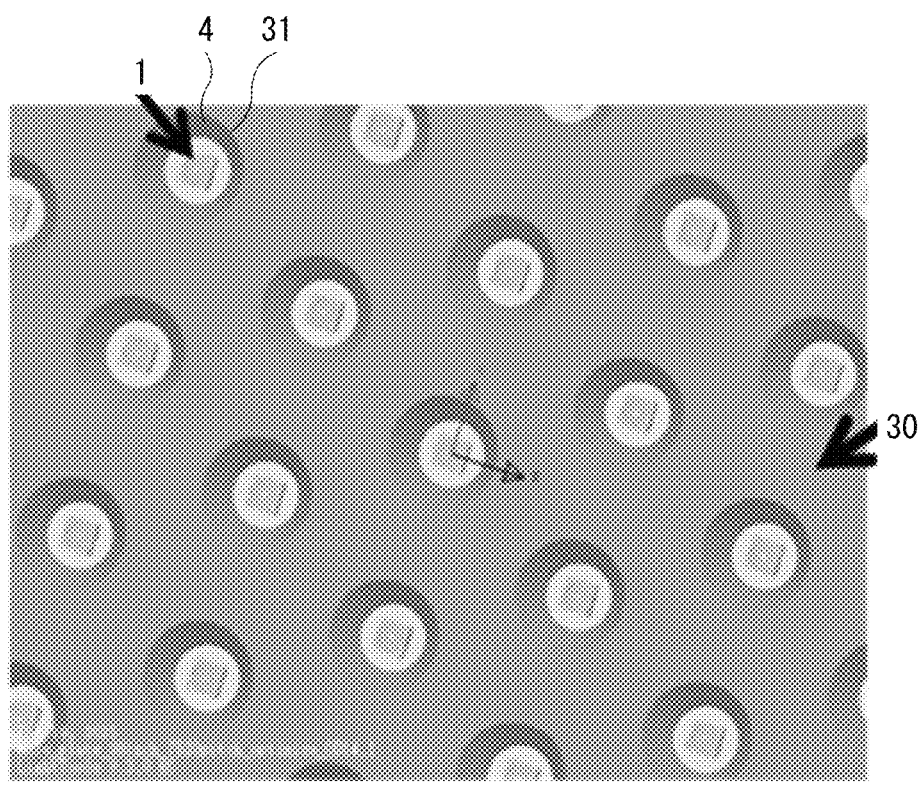
FIG. 43 is a planar diagram illustrating a configuration example of the arrayed walls in the optical unit according to the comparative example.
Figure 44:
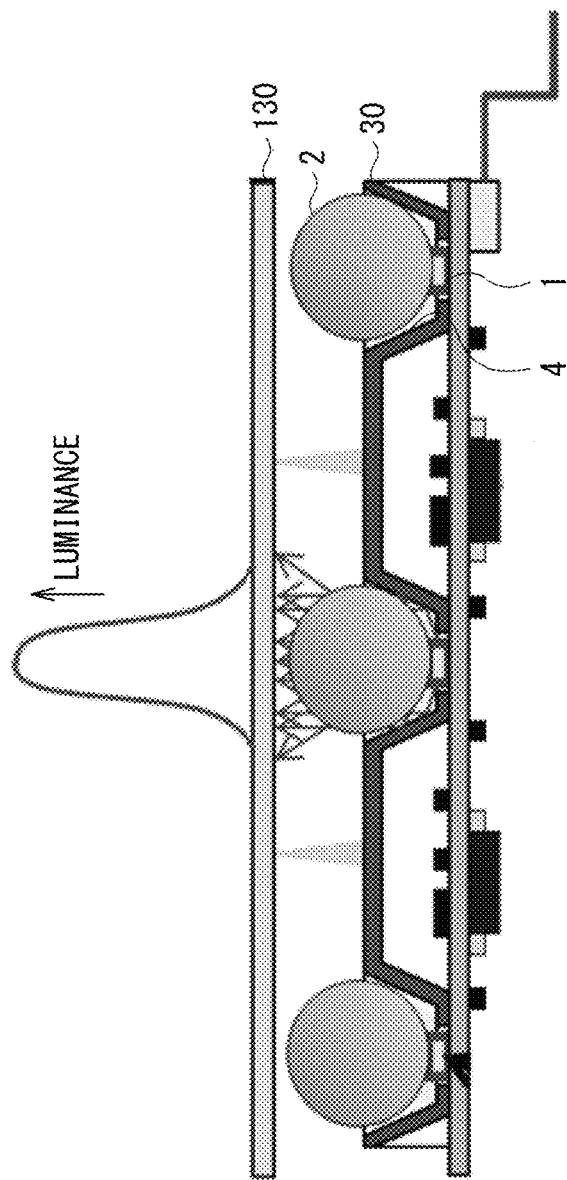
FIG. 44 is a cross-sectional diagram illustrating a configuration example of the optical unit according to one embodiment provided with arrayed walls.
Figure 45:
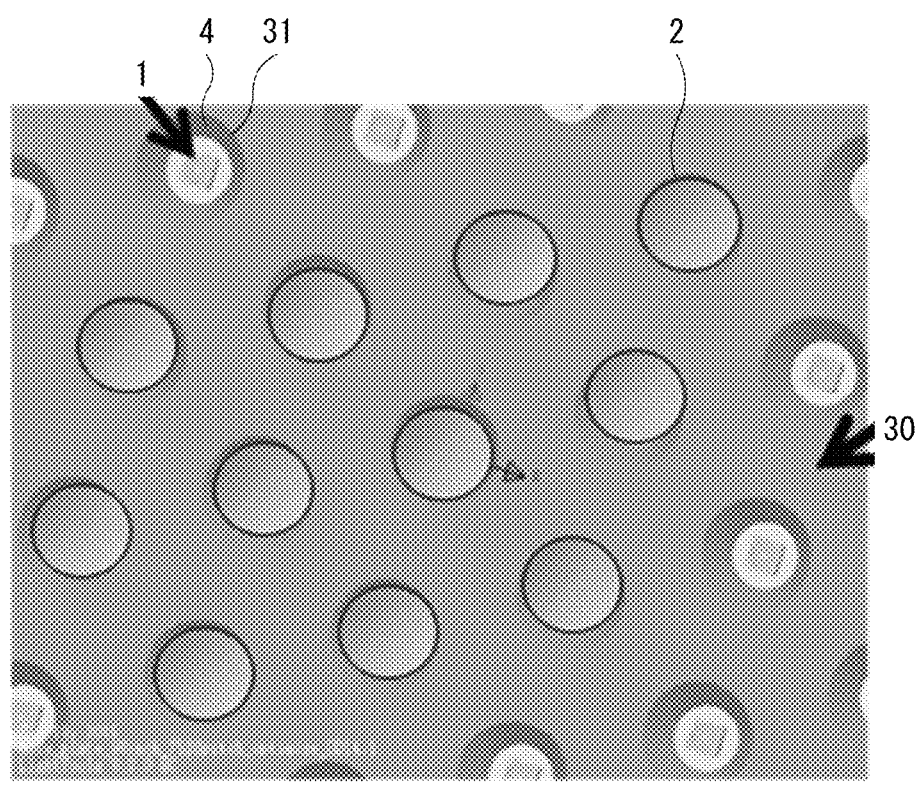
FIG. 45 is a planar diagram illustrating a configuration example of the arrayed walls and ball lenses in the optical unit according to one embodiment.

The approach of using the wall 3 as described above is also useful in arraying. FIG. 42 illustrates an example of an optical unit according to a comparative example including arrayed walls 3 (a plate 30). FIG. 43 illustrates a planar configuration example of the arrayed walls 3 (the plate 30) in the optical unit according to the comparative example. FIG. 44 illustrates a configuration example of the optical unit according to the first embodiment provided with the arrayed walls 3 (the plate 30). FIG. 45 illustrates a planar configuration example of the arrayed walls 3 (the plate 30) and the ball lenses 2 in the optical unit according to the first embodiment.

The optical unit according to the comparative example illustrated in FIGS. 42 and 43 includes a plurality of arrayed light sources 1 and the plate 30. The plate 30 has holes 31 at positions respectively corresponding to the light sources 1. The holes 31 are cylindrical shaped or shaped like an upside-down truncated cone. Each hole 31 is surrounded by the reflection surface 4 for reflecting light beams from the light source 1. Furthermore, the optical unit according to the comparative example illustrated in FIGS. 42 and 43 is provided with the optical sheet layer 130 above the plate 30 in order to uniformize and enhance luminance. In contrast, the optical unit according to the first embodiment illustrated in FIGS. 44 and 45 has a configuration in which the ball lenses 2 are respectively disposed in the holes 31 of the plate 30. Note that the ball lenses 2 may be integrally molded into an arrayed structure as in the configuration example illustrated in FIGS. 8 to 10.

What follows is an example where the light source 1 is non-Lambertian.

The description so far has been made with the light source 1 having a Lambertian light distribution characteristic. However, the optical unit according to the first embodiment is also applicable to a case where the light source 1 has a non-Lambertian light distribution characteristic. In general, various light distributions are available from light sources. Some light sources may provide a wide light distribution, and others may provide narrower light distributions for use in light condensing applications.

Figure 46:
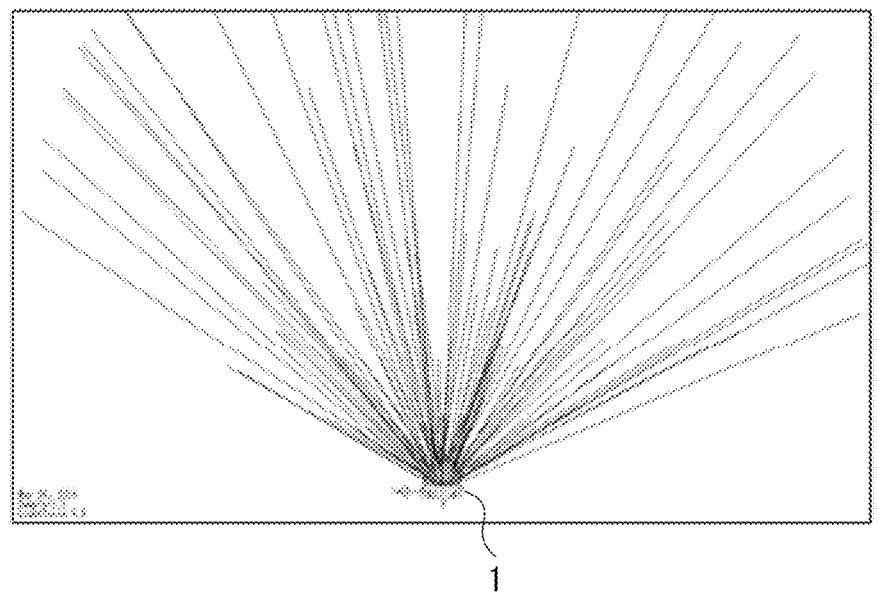
FIG. 46 is a side view diagram illustrating a configuration example of a light source of a non-Lambertian light distribution along with simulation results of trajectories of outputted light beams.
Figure 47:
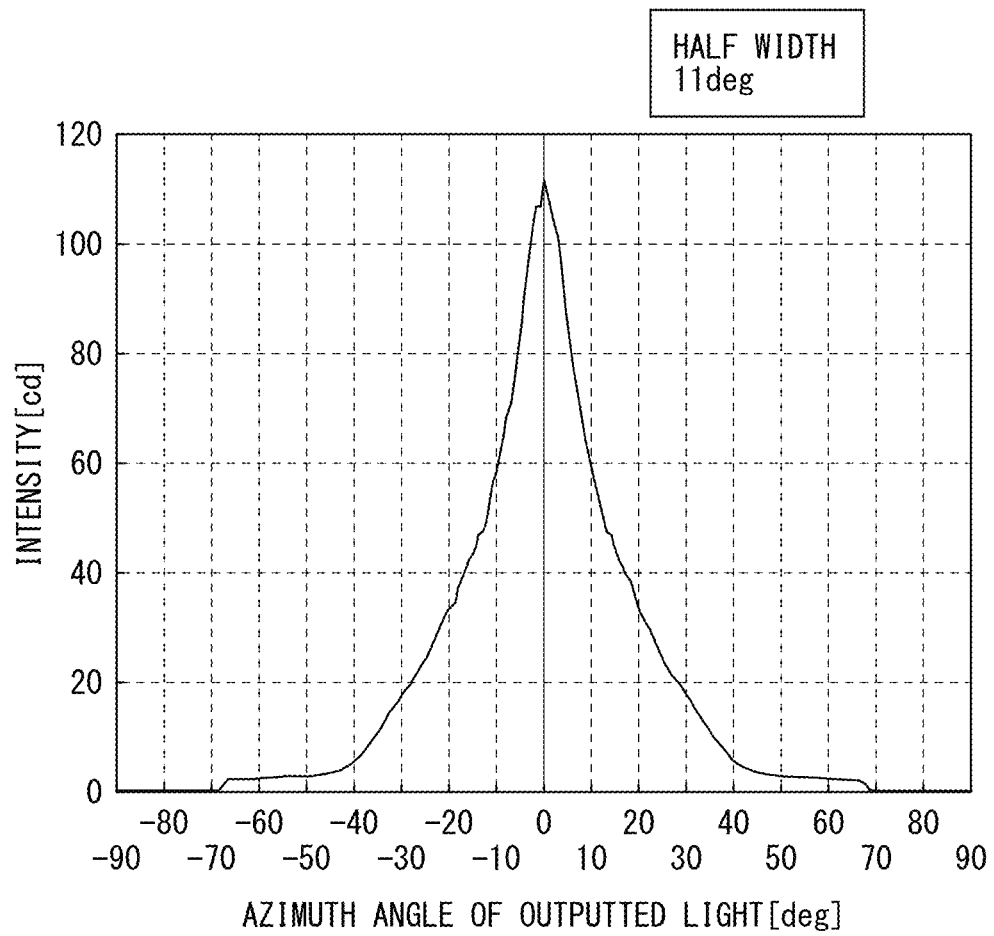
FIG. 47 is a characteristic diagram illustrating an example of a light distribution characteristic of the light source of a non-Lambertian light distribution.
Figure 48:
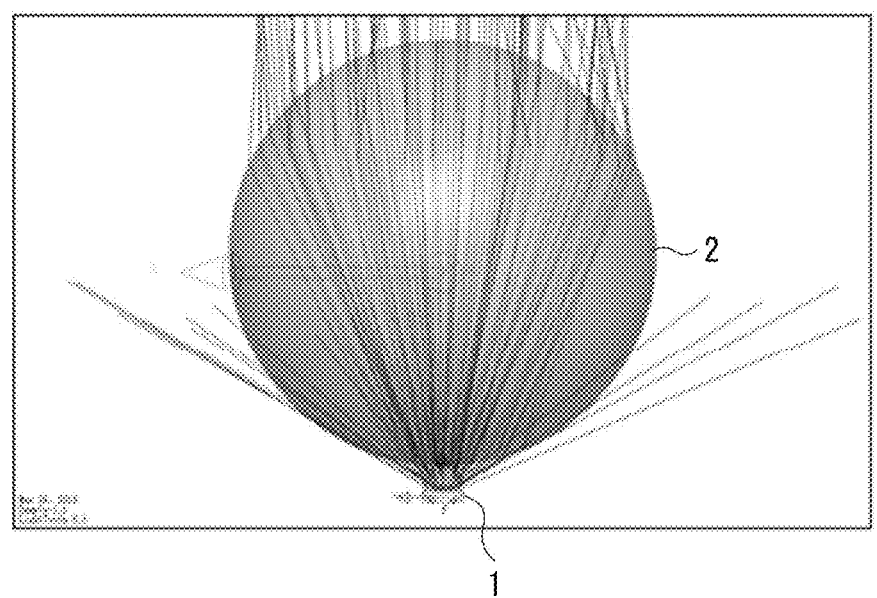
FIG. 48 is a side view diagram illustrating a configuration example of the optical unit according to one embodiment in which the light source of a non-Lambertian light distribution and the ball lens are combined together, along with simulation results of trajectories of outputted light beams.
Figure 49:
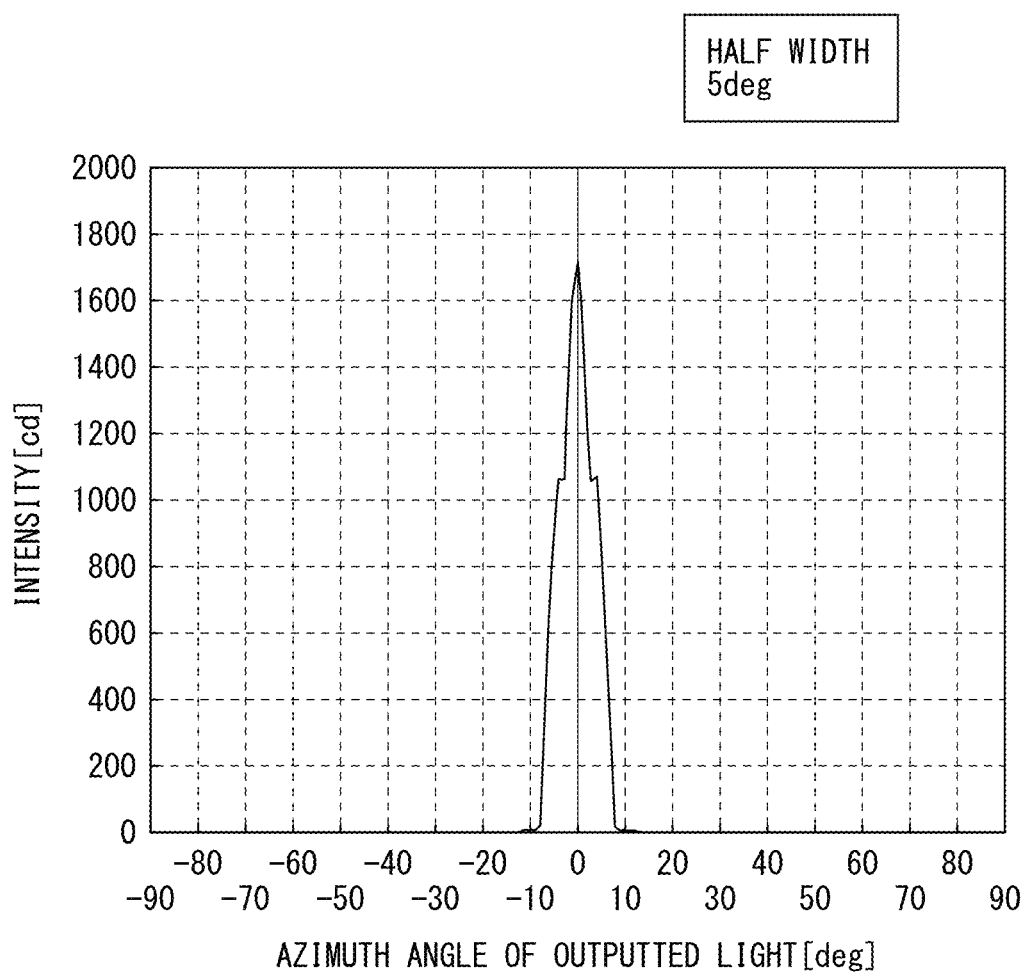
FIG. 49 is a characteristic diagram illustrating an example of a light distribution characteristic of the optical unit according to one embodiment in the case where the light source of a non-Lambertian light distribution and the ball lens are combined together.
Figure 50:
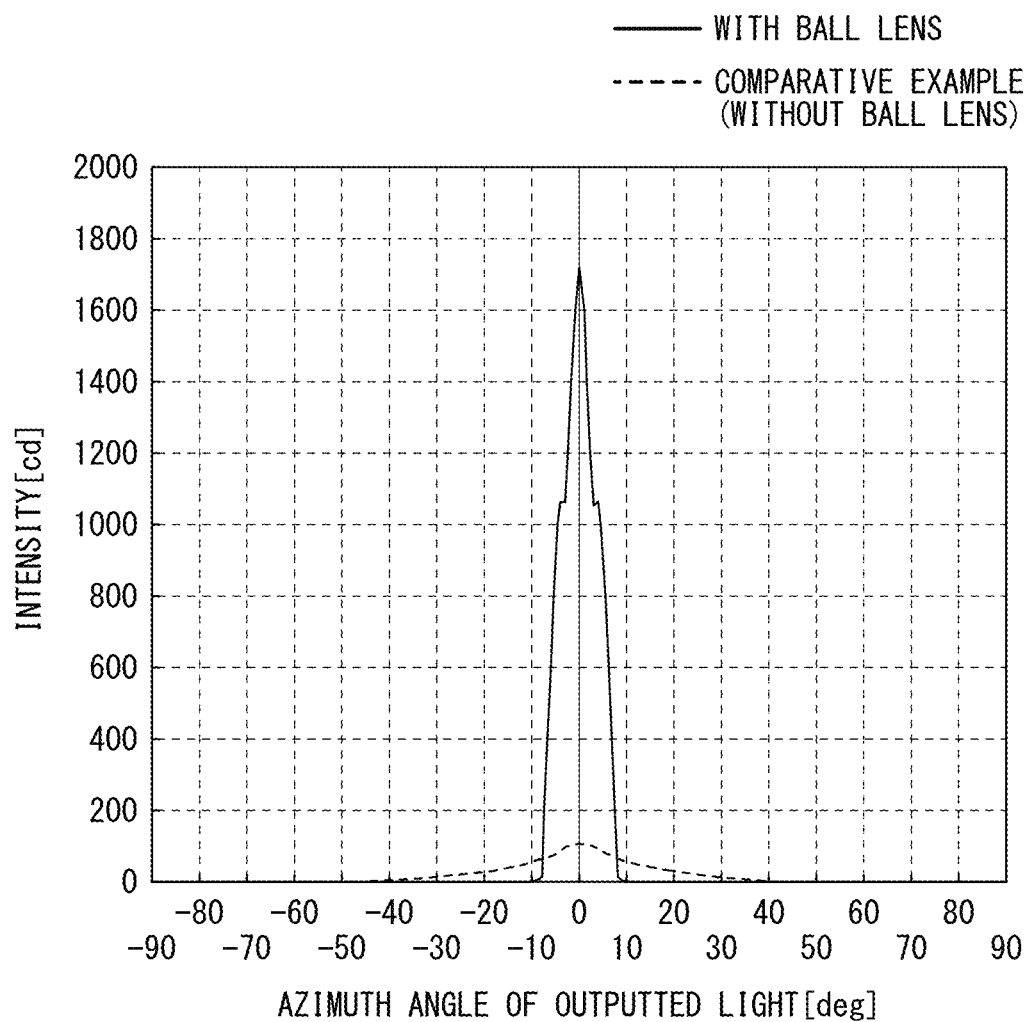
FIG. 50 is a characteristic diagram illustrating a comparison between the light distribution characteristic illustrated in FIG. 47 and that illustrated in FIG. 49.

FIG. 46 illustrates a configuration example of the light source 1 of a non-Lambertian light distribution, along with simulation results of trajectories of outputted light beams. FIG. 47 illustrates an example of a light distribution characteristic of the light source 1 of a non-Lambertian light distribution. FIG. 48 illustrates a configuration example of the optical unit according to the first embodiment in which the light source 1 of a non-Lambertian light distribution and the ball lens 2 are combined together, along with simulation results of trajectories of outputted light beams. FIG. 49 illustrates an example of a light distribution characteristic of the optical unit according to the first embodiment with the light source 1 of a non-Lambertian light distribution and the ball lens 2 combined together. FIG. 50 illustrates a comparison between the light distribution characteristic illustrated in FIG. 47 and that illustrated in FIG. 49.

The light source 1 of the non-Lambertian light distribution illustrated in FIG. 46 is already packaged into an LED package including an LED with a resin lens mounted thereon, and configured to output light beams that are to exhibit a relatively narrow light distribution with respect to azimuth angle, as illustrated in FIG. 47.

FIG. 48 illustrates a configuration example in which the light source 1 of the non-Lambertian light distribution illustrated in FIG. 46 and the ball lens 2 are combined together. The light source 1 of the non-Lambertian light distribution illustrated in FIG. 46 is already packaged into an LED package with a resin lens mounted on the light source 1, as mentioned above. With the size of the entire LED package assumed as approximately 6 mm and with this size assumed as the light source diameter φ of the light source 1, the lens diameter D of the ball lens 2 may be determined to satisfy φ/D=20% in consideration of the foregoing region Q. The result is that D=30 mm.

FIG. 48 illustrates trajectories of light beams in a case where the ball lens 2 of resin having a lens diameter D of 30 mm and a refractive index n of 1.49 is provided over the light source 1. As illustrated in FIGS. 49 and 50, it is seen that the provision of the ball lens 2 significantly reduces the half width, resulting in improved light condensing performance. It is thus seen that in a case where it is desired to achieve a certain level of light condensing, if not completely parallel light, the approach of the optical unit according to the first embodiment is widely effective and useful in a variety of ways. As illustrated in FIGS. 49 and 50, it is possible to condense light beams from the light source 1 of a non-Lambertian light distribution without losses. This makes it possible to unidirectionally align the light beams.

(Optimization of Planar Arrangement of the Ball Lenses 2)

Next, a description will be given of a method of arranging a plurality of ball lenses 2 as densely as possible when arraying the plurality of ball lenses 2 as illustrated in FIGS. 8 to 10. By arranging the plurality of ball lenses 2 as densely as possible, it is possible to reduce unevenness of luminance. Here, for simplicity of explanation, assume that a plurality of circles is to be arranged in a two-dimensional plane. As examples of arrangement combinations for increasing arrangement density (packing density) of a plurality of ball lenses 2, various types of geometric patterns are known from methods of tiling circles. The technique of enhancing packing density by using such methods is applicable to the technology of the optical unit according to the first embodiment. By arraying not only a single type of ball lenses 2 of the same lens diameter but also two or more types of ball lenses 2 of different lens diameters in combination, it is possible to achieve higher packing density, which consequently makes it possible to enhance luminance per unit area, as well as contributing to reduction in unevenness of optical luminance. Note that the two or more types of ball lenses 2 may each include multiple ball lenses 2.

Figure 51:
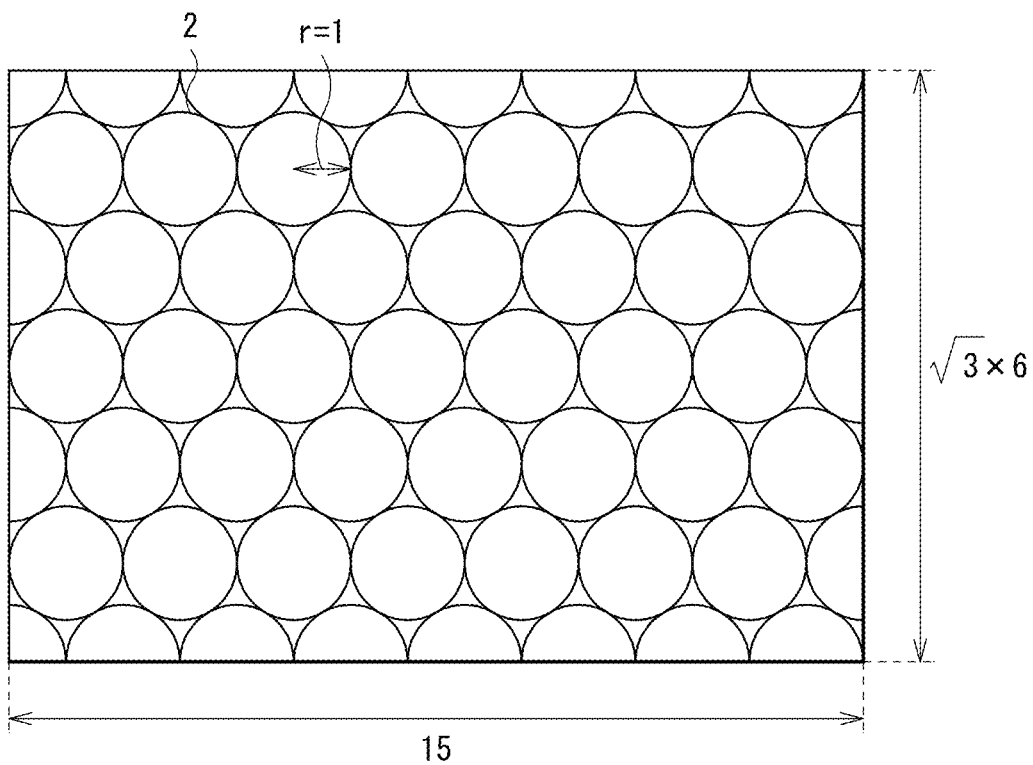
FIG. 51 is a planar diagram illustrating a first configuration example in which a plurality of ball lenses is arranged in enhanced packing density in the optical unit according to one embodiment.

FIG. 51 illustrate a first configuration example in which the plurality of ball lenses 2 is arranged in enhanced packing density in the optical unit according to the first embodiment. The packing density of the plurality of ball lenses 2 is represented by the ratio of a projection area of actually tiled ball lenses 2 (a total area of circles) to an area of a region where the ball lenses are to be tiled. Referring to FIG. 51, the packing density is the ratio of the area of the circles contained in the rectangle in which the ball lenses 2 are to be tiled to the area of the entire rectangle, and is determined as follows.

In a case where a single kind of ball lenses 2 having a radius r of 1 is tiled inside a rectangle having a length of 15 and a width of √3×6 in the highest packing density, the total area of the circles corresponds to an area $\pi$ of each single circle multiplied by the total number of the circles, i.e., 45, thus being determined as follows.

$$\pi \times 45 = 141.3717 \quad (A)$$

The area of the rectangle is as follows.

$$15(\text{length}) \times (\sqrt{3} \times 6)(\text{width}) = 155.8845727 \quad (B)$$

The packing density is determined as follows.

$$\text{Expression }(A)/\text{Expression }(B) = 0.906899682$$

Figure 52:
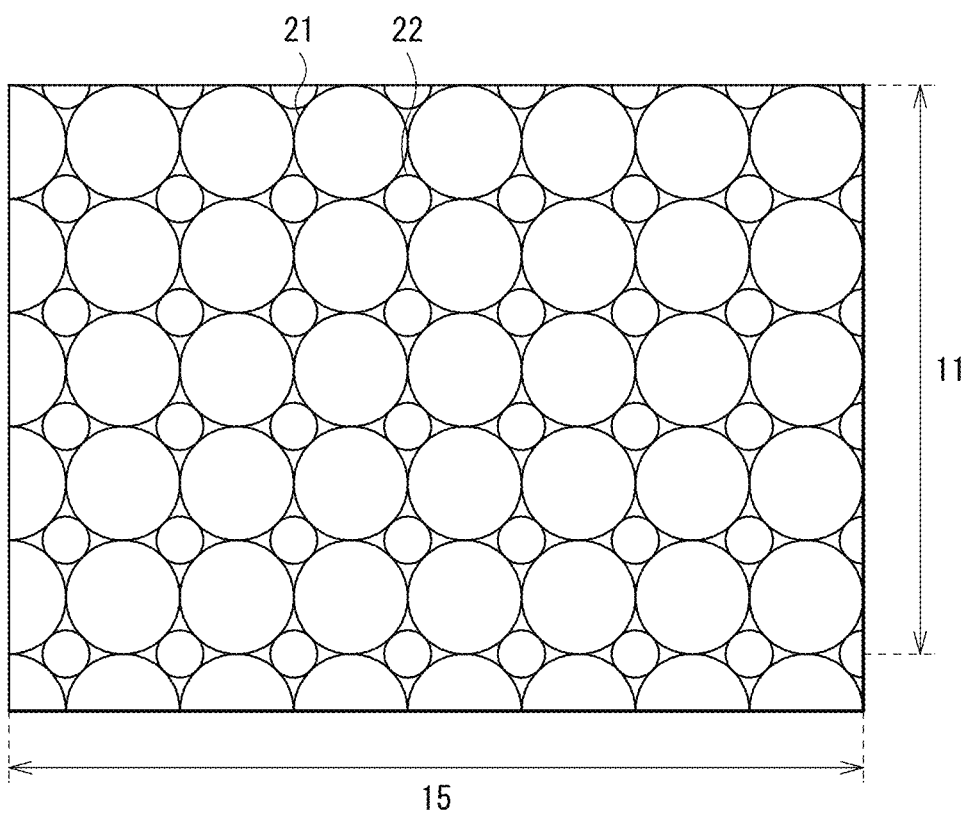
FIG. 52 is a planar diagram illustrating a second configuration example in which a plurality of ball lenses is arranged in enhanced packing density in the optical unit according to one embodiment.
Figure 53:
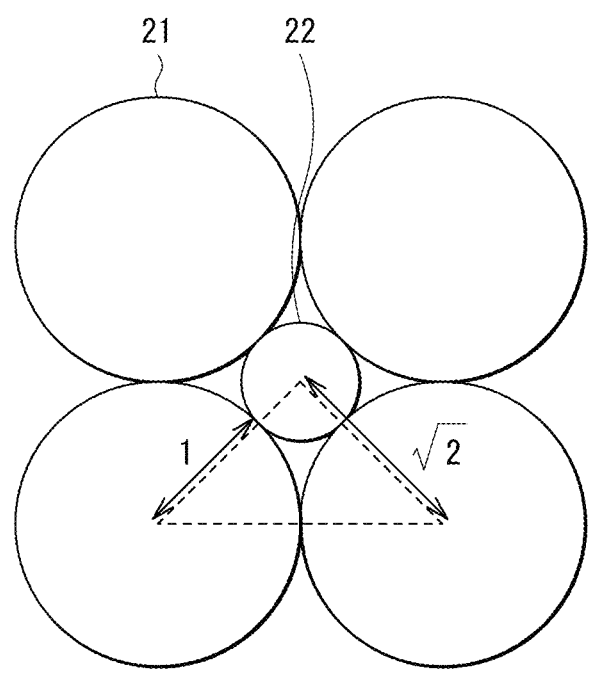
FIG. 53 is a planar diagram illustrating a dimension example of the plurality of ball lenses in the second configuration example illustrated in FIG. 52.

FIG. 52 illustrates a second configuration example in which the plurality of ball lenses 2 is arranged in enhanced packing density in the optical unit according to the first embodiment. FIG. 53 illustrates a dimension example of the plurality of ball lenses 2 in the second configuration example illustrated in FIG. 52.

The second configuration example illustrated in FIG. 52 is an example in which a plurality of first-type ball lenses 21 are arranged along with a plurality of second-type ball lenses 22 serving as auxiliary lenses, which are smaller in diameter than the first-type ball lenses 21.

For simplicity of explanation, assume here that two types of circles, that is, large circles (the first-type ball lenses 21) and small circles (the second-type ball lenses 22), are being arranged in a two-dimensional plane.

FIGS. 52 and 53 each illustrate an example in which the circles are arranged in the highest packing density by providing, in addition to the large circles having a radius of 1, the small circles having a radius of 0.414214 (=√2−1) in the spaces between the large circles. As illustrated in FIG. 53, because the radius of the large circles is 1 and lines connecting the centers of three adjacent circles define a right isosceles triangle with two 45-degree angles, the hypotenuse of the triangle has a length of √2. Therefore, the radius of the small circles is (√2−1).

This leads to the conclusion that in the case where the first-type and second-type ball lenses 21 and 22 are arranged in the highest packing density inside a rectangle having a length of 15 and a width of 11, the total area of the large circles is 41.257$\pi$ and the total area of the small circles is 41.25×(√2−1)²×$\pi$. The ratio of the total area of the two types of circles, i.e., the large and small circles, to the area of the rectangle is the packing density, which is determined as follows.

$$[(41.257\pi + 41.25 \times (\sqrt{2}-1)^2 \times \pi)/(11 \times 15)] = 0.920151185$$

Thus, the packing density is 0.920151185, achieving a further improvement relative to the case of arranging a single type of ball lenses 2.

Note that three or more types of ball lenses 2 different in diameter may be arranged.

1.3. Effects

As has been described, according to the optical unit, the illumination apparatus, and the display of the first embodiment, light from the light source 1 is condensed and outputted by the ball lens 2. This makes it possible to obtain a desired light distribution characteristic efficiently.

For example, according to the optical unit of the first embodiment, the light emitting surface of the light source 1 is located closer to the ball lens 2 than the focal position of the ball lens 2. This makes it possible to capture almost all light beams outputted from the light source 1 into the ball lens 2 even if the distribution of the outputted light beams is Lambertian. Efficient light condensing is thus possible without any stepwise condensing processes other than the ball lens 2.

Furthermore, with the optical unit according to the first embodiment, in the case where a plurality of light sources 1 are arranged two-dimensionally in an array in a plane, it is possible to produce a substantially collimated light source of a planar shape by also arranging the ball lenses 2 in an array similarly.

Furthermore, according to the optical unit of the first embodiment, the spherical shape of the ball lens 2 imparts a retroreflection property to the light emitting surface. This provides suitability for construction into an array or a box structure.

In the optical unit according to the first embodiment, the light source diameter $\phi$ of the light source 1 and the lens diameter D of the ball lens 2 to be used may satisfy the relationship that the ratio $\phi/D$ is 38% or less in a case where, for example, the refractive index n of the lens material is 1.4 to 1.8. In addition, regarding the distance $\Delta L$ between the light emitting surface of the light source 1 and the ball lens 2, in one example embodiment the ball lens 2 and the light source 1 are disposed in close proximity to each other to achieve $\Delta L/D$ of 3.5% or less. However, in a case where it is difficult to dispose the ball lens 2 and the light source 1 in close proximity to each other to achieve $\Delta L/D$ of 3.5% or less, providing the reflection surface 4 surrounding the ball lens 2 and the light source 1 makes it possible to maintain the light utilization efficiency in a practical range. The optical unit according to the first embodiment is able to exhibit a light condensing effect even if the distribution of the outputted light beams from the light source 1 is non-Lambertian. In such a case, it is more effective to satisfy the above-described relationship between the light source diameter CD of the light source 1 and the lens diameter D of the ball lens 2 to be used.

It should be appreciated that the effects described herein are mere illustrative and non-limiting examples, and any other effects may be achieved. The same applies to the effects of other embodiments described below.

1.4. Modification Example

The description so far has not mentioned the color of the light source 1. A plurality of light sources 1 of different colors may be arranged in an array configuration.

2. Second Embodiment

Next, a second embodiment of the disclosure will be described. In the following description, components that are common to those of the optical unit according to the foregoing first embodiment are assigned with the same reference numerals and redundant descriptions thereof will be omitted.

2.1. Configuration

The optical unit according to the first embodiment is applicable to an optical communication apparatus that uses visible light or near-infrared light, for example.

Figure 54:
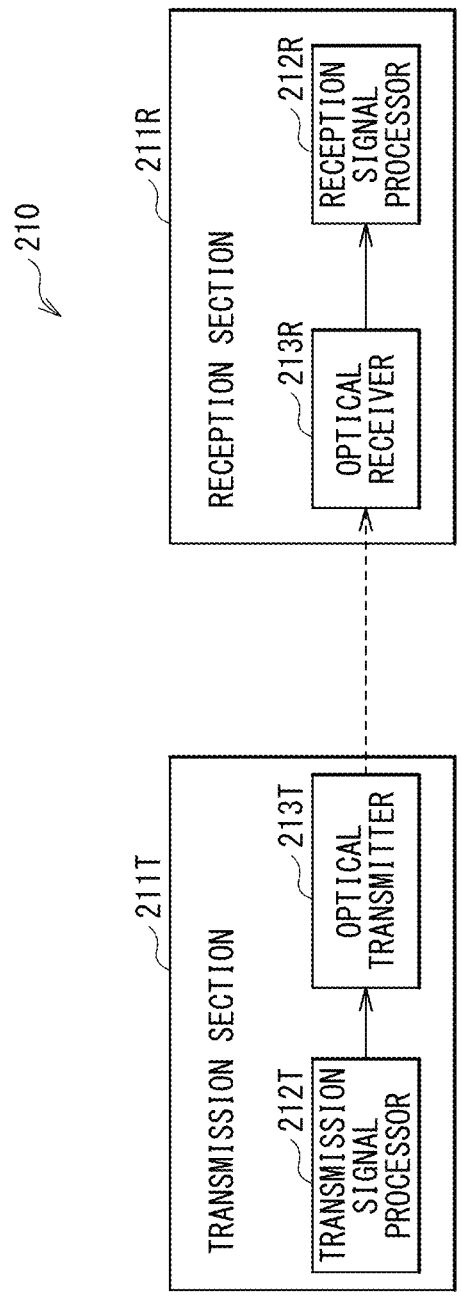
FIG. 54 is a block diagram schematically illustrating a configuration example of an optical communication apparatus according to one embodiment.

FIG. 54 schematically illustrates a configuration example of an optical communication apparatus 210 according to the second embodiment of the disclosure.

The optical communication apparatus 210 may include a transmission section 211T and a reception section 211R.

The transmission section 211T may include a transmission signal processor 212T and an optical transmitter 213T. The transmission signal processor 212T may generate a transmission signal and may output the transmission signal to the optical transmitter 213T. The optical transmitter 213T may convert the transmission signal received from the transmission signal processor 212T into an optical signal and may output the optical signal.

The reception section 211R may include an optical receiver 213R and a reception signal processor 212R. The optical receiver 213R may receive the optical signal from the optical transmitter 213T and may convert the optical signal into an electric signal. The reception signal processor 212R may process the photoelectric converted signal from the optical receiver 213R as a reception signal.

Figure 55:
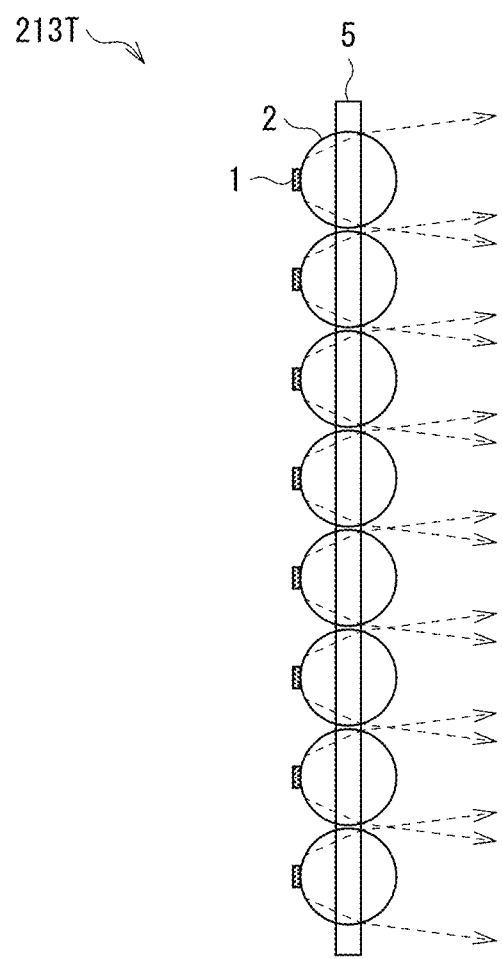
FIG. 55 is a cross-sectional diagram schematically illustrating a configuration example of an optical transmitter in the optical communication apparatus according to one embodiment.

FIG. 55 schematically illustrates a configuration example of the optical transmitter 213T.

The optical transmitter 213T includes a plurality of ball lenses 2 that are one-dimensionally or two-dimensionally arrayed and provided with the brim part 5, and a plurality of light sources 1 provided respectively in correspondence with the plurality of ball lenses 2. The functions of the light sources 1 and the ball lenses 2 are basically similar to those in the illumination apparatus according to the foregoing first embodiment, except that what is outputted is not illumination light but optical signals.

Figure 56:
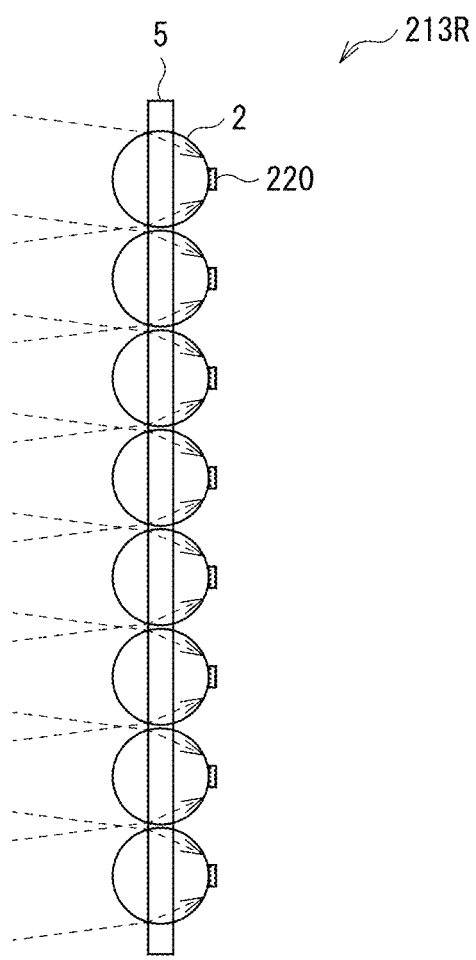
FIG. 56 is a cross-sectional diagram schematically illustrating a configuration example of an optical receiver in the optical communication apparatus according to one embodiment.

FIG. 56 schematically illustrates a configuration example of the optical receiver 213R.

The optical receiver 213R includes a plurality of ball lenses 2 that are one-dimensionally or two-dimensionally arrayed and provided with the brim part 5, and a plurality of photodetectors (light receiving devices) 220 provided respectively in correspondence with the plurality of ball lenses 2. Note that for the sake of distinction from the ball lenses 2 that the optical transmitter 213T includes, the ball lenses 2 that the optical receiver 213R includes will hereinafter be referred to as second ball lenses 2. Each of the second ball lenses 2 condenses light (optical signal) and outputs the condensed light toward a corresponding one of the photodetectors 220. Each of the photodetectors 220 has a light receiving surface and receives light outputted from a corresponding one of the second ball lenses 2. The light receiving surface is located closer to the corresponding one of the second ball lenses 2 than a focal position of the corresponding one of the second ball lenses 2. The photodetectors 220 may be disposed at positions corresponding to the light sources 1 of the optical unit according to the foregoing first embodiment.

2.2. Workings and Effects

Regarding the electromagnetic wave region used for, e.g., satellite communications, attempts have been made to transmit electromagnetic waves over a large distance under the constraint of limited power for transmission. For example, concentration means such as a parabolic antenna is used to achieve enhanced directivity of azimuth of outputted electromagnetic waves. The parabolic antenna is heavy in weight, which poses limitations to mounting on satellite equipment, etc.

The principle and method of light condensing with the optical unit according to the foregoing first embodiment may provide potential applicability to the electromagnetic wave region of invisible light in terms of weight reduction. As one example under the current situation, there is a similar concept for millimeter waves. In this example, however, it is difficult to effectively increase packing density in arraying because the lenses used are not the ball lenses 2.

Figure 57:
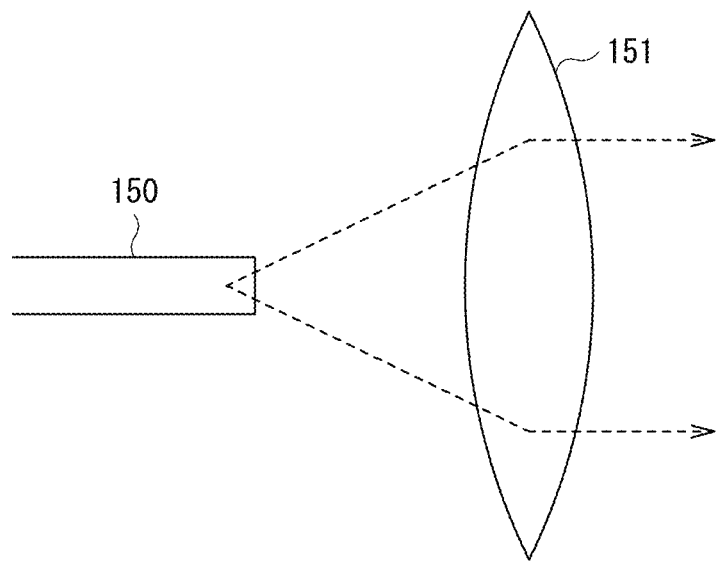
FIG. 57 is a cross-sectional diagram illustrating a first configuration example of an optical communication apparatus according to a comparative example against the optical communication apparatus according to one embodiment.
Figure 58:
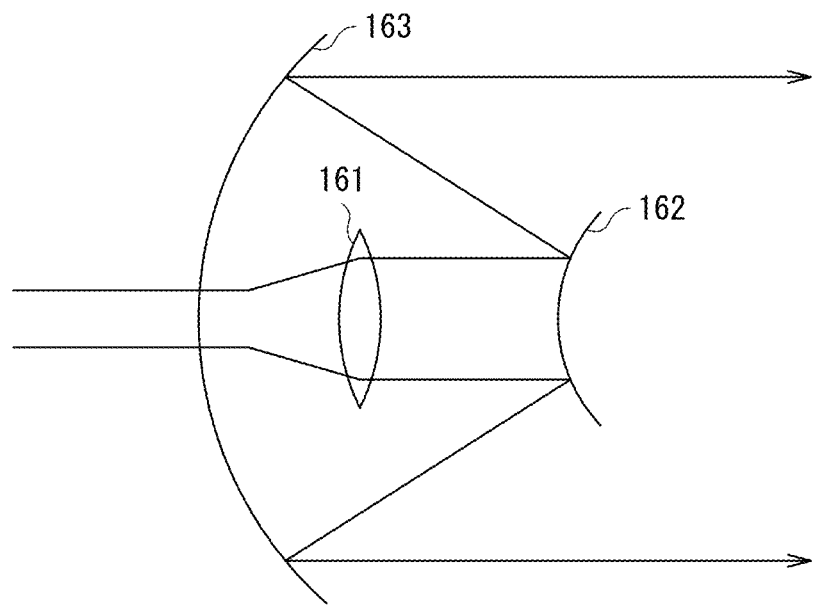
FIG. 58 is a cross-sectional diagram illustrating a second configuration example of the optical communication apparatus according to the comparative example against the optical communication apparatus according to one embodiment.

As comparative examples against the optical communication apparatus 210 according to the second embodiment, configuration examples of optical communication apparatuses for millimeter wave bands are illustrated in FIGS. 57 and 58. FIGS. 57 and 58 illustrate configuration examples of transmission sections in the optical communication apparatuses for millimeter wave bands.

The optical communication apparatus according to the comparative example illustrated in FIG. 57 has a configuration in which a waveguide 150 and a millimeter wave lens 151 are combined together. The optical communication apparatus according to the comparative example illustrated in FIG. 58 is a Cassegrain antenna, and has a configuration in which a millimeter wave lens (a primary radiator) 161, a subreflector 162, and a main reflector 163 are combined together.

Although light is one of electromagnetic waves, it has properties different from those of electromagnetic waves. Radiation such as X-rays and gamma rays is also one of electromagnetic waves having extremely short wavelengths. Visible light is one of electromagnetic waves in visible region, having wavelengths of the order of nanometers. Regarding radio waves for radars such as microwaves and millimeter waves longer in wavelength than visible light, there is a configuration example of an antenna that achieves light condensing performance similar to that of the optical unit according to the foregoing first embodiment by using a dielectric lens.

In this connection, some characteristics specific to visible light will be described. Microwaves and millimeter waves, which have longer wavelengths than infrared rays, are more diffractive than light because of their longer wavelengths than visible light. They are thus easily hindered, due to the diffraction phenomenon, from traveling in straight lines by an obstacle or the like and then weakened. When compared with visible light, they are less capable of traveling in straight lines in a certain direction.

On the other hand, electromagnetic waves that have wavelengths shorter than those of visible light and shorter than or equal to those of ultraviolet rays are more capable of traveling in straight lines, but have energy harmful to life and are easily absorbed into the earth's atmosphere, thus being unsuitable for use in communications. For example, if radio equipment using such electromagnetic waves is mounted on a satellite or the like for communications with the ground, those electromagnetic waves are disadvantageously absorbed into the atmosphere to fail to reach the ground. Considering this, one of electromagnetic waves that is highly capable of traveling in straight lines and is not absorbed into air is visible light. Visible light is thus relatively easy to handle among electromagnetic waves for use in communications.

Among visible light, however, blue light undergoes scattering in the atmosphere. In a case of making transmissions vertically from the air to the ground, light beams closer to the red zone are thus more desirable. Although not visible to the naked eye, the near-infrared radiation range close to visible light is less susceptible to diffraction and more capable of travelling in straight lines than radio waves longer in wavelength than infrared rays. This property is considered to be apparent from, e.g., the fact that infrared cameras that are able to capture sharp images of an object even in fog are practically used. Therefore, applying the technology of the optical unit according to the foregoing first embodiment to, e.g., infrared LEDs is considered to be greatly advantageous in a case where the infrared LEDs are used on the transmission side for communications. Furthermore, when light conversion efficiency with the light source 1 is improved, application thereof to optical communications may make it possible to dispense with parabolic antennas, leading to a possibility of evolution in the field of, e.g., aerospace through the weight reduction.

Other configurations, operations, and effects are substantially similar to those of the optical unit according to the foregoing first embodiment.

3. Other Embodiment

Although the disclosure is described with reference to the example embodiments and the application examples hereinabove, these example embodiments and application examples are not to be construed as limiting the scope of the disclosure and may be modified in a wide variety of ways. It should be appreciated that the effects described herein are mere examples. Effects of the example embodiment and application examples of the disclosure are not limited to those described herein, and may be different from those described herein. The disclosure may further include any effects other than those described herein. Furthermore, the technology encompasses any possible combination of some or all of the various embodiments and the modifications described herein and incorporated herein.

It is possible to achieve at least the following configurations from the above-described example embodiments of the disclosure. According to the disclosure with the following configurations, light from the light source is condensed by the ball lens and the condensed light is outputted by the ball lens. This makes it possible to obtain a desired light distribution characteristic efficiently.

(1) An optical unit including:
a ball lens configured to condense light and to output the condensed light; and
a light source having a light emitting surface and configured to output light toward the ball lens, the light emitting surface being located closer to the ball lens than a focal position of the ball lens.

(2) The optical unit according to (1), in which $\Delta L/D$ is 3.5% or less, where D represents a lens diameter of the ball lens, and $\Delta L$ represents a distance between the light emitting surface of the light source and the ball lens.

(3) The optical unit according to (1) or (2), in which $\phi/D$ is 38% or less, where D represents a lens diameter of the ball lens, and $\phi$ represents a light source diameter, the light source diameter being a diameter of the light emitting surface of the light source, including a circle-equivalent diameter of the light emitting surface.

(4) The optical unit according to any one of (1) to (3), further including a wall having an inner surface configured to function as a reflection surface, the wall being disposed with the reflection surface situated around the ball lens, and being configured to reflect light from the light source toward the ball lens.

(5) The optical unit according to any one of (1) to (4), further including an optical sheet configured to allow a first portion of outputted light from the ball lens to pass and reflect a second portion of the outputted light into return light to the ball lens.

(6) The optical unit according to (5), further including an optical box containing the light source and the ball lens, the optical box being provided with the optical sheet disposed on a light-outputting surface side of the ball lens.

(7) The optical unit according to any of (1) to (6), in which the ball lens includes a plurality of ball lenses, and the light source includes a plurality of light sources, the plurality of light sources being provided respectively in correspondence with the plurality of ball lenses.

(8) The optical unit according to (7), in which the plurality of ball lenses is arrayed and integrated with each other.

(9) The optical unit according to any of (1) to (6), in which
the ball lens includes a plurality of ball lenses,
the light source includes a plurality of light sources,
the plurality of ball lenses includes two or more types of ball lenses of different lens diameters, the two or more types of ball lenses each including multiple ball lenses, and
the plurality of light sources is provided respectively in correspondence with the plurality of ball lenses.

(10) The optical unit according to any of (1) to (9), in which the light source has a Lambertian light distribution characteristic.

(11) The optical unit according to any of (1) to (10), in which the ball lens is configured to output collimated light.

(12) The optical unit according to any of (1) to (11), in which the ball lens includes a material having a uniform refractive index.

(13) An illumination apparatus including:
a ball lens configured to condense light and to output the condensed light as illumination light; and
a light source having a light emitting surface and configured to output light toward the ball lens, the light emitting surface being located closer to the ball lens than a focal position of the ball lens.

(14) The illumination apparatus according to (13), in which
the ball lens includes a plurality of ball lenses,
the light source includes a plurality of light sources, the plurality of light sources being provided respectively in correspondence with the plurality of ball lenses, and
the plurality of ball lenses and the plurality of light sources form a surface light source as a whole.

(15) A display including:
a plurality of ball lenses configured to condense light and to output the condensed light; and
a plurality of light sources provided respectively in correspondence with the plurality of ball lenses, each of the plurality of light sources having a light emitting surface and being configured to output light toward a corresponding one of the plurality of ball lenses, the light emitting surface being located closer to the corresponding one of the plurality of ball lenses than a focal position of the corresponding one of the plurality of ball lenses.

(16) The display according to (15), further including an optical modulator configured to modulate light outputted from the plurality of ball lenses.

(17) The display according to (15), in which at least one of the plurality of ball lenses forms one pixel.

(18) An optical communication apparatus including an optical transmitter, the optical transmitter including:
- a ball lens configured to condense light and to output the condensed light; and
- a light source having a light emitting surface and configured to output light toward the ball lens, the light emitting surface being located closer to the ball lens than a focal position of the ball lens.

(19) The optical communication apparatus according to (18), further including an optical receiver, the optical receiver including:
- a second ball lens configured to condense light; and
- a light receiving device having a light receiving surface and configured to receive light outputted from the second ball lens, the light receiving surface being located closer to the second ball lens than a focal position of the second ball lens.

According to the optical unit, the illumination apparatus, the display, and the optical communication apparatus of at least one embodiment of the disclosure, light from the light source is condensed and outputted by the ball lens.

Although the disclosure has been described in terms of exemplary embodiments, it is not limited thereto. It should be appreciated that variations may be made in the described embodiments by persons skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. As used herein, the singular form "a", "an" and "the" include plural references unless the context clearly dictates otherwise. The term "substantially" and its variations are defined as being largely but not necessarily wholly what is specified as understood by one of ordinary skill in the art. The term "approximately" or "on the order of" as used herein can allow for a degree of variability in a value or range. Moreover, no element or component in this disclosure is intended to be dedicated to the public regardless of whether the element or component is explicitly recited in the following claims.

What is claimed is:

1. An optical unit, comprising:
    a first plurality of ball lenses and a first plurality of first light sources, the first plurality of ball lenses comprising ball lenses of a first type, the first light sources are the same; and
    a second plurality of ball lenses and a second plurality of second light sources, the second plurality of ball lenses comprising ball lenses of a second type in which the first type is different than the second type, the second light sources are the same,
    wherein the ball lenses of the first plurality and the second plurality of ball lenses are configured to:
    receive light from the respective light sources and condense the received light; and
    output the condensed light;
    each light source of the respective light sources having a light emitting surface, wherein
    each light source of the respective light sources is configured to emit the light toward each ball lens of the respective ball lenses via the respective light emitting surface, and
    the respective light emitting surface is located closer to the respective ball lens than a focal position of the respective ball lens; and
    an optical sheet configured to:
    pass a first portion of the output light that is output from the first plurality and second plurality of ball lenses; and
    reflect a second portion of the output light to return to the first plurality and second plurality of ball lenses,
    wherein the first plurality and second plurality of ball lenses include a material having a uniform refractive index.

2. The optical unit according to claim 1, wherein $\Delta L/D$ is one of 3.5% or less than 3.5%, where
    D represents a lens diameter of each ball lens of the first or second plurality of ball lenses, and
    $\Delta L$ represents a distance between the light emitting surface of the corresponding light source and the corresponding ball lens.

3. The optical unit according to claim 1, wherein $\Phi/D$ is one of 38% or less than 38%, where
    D represents a lens diameter of each ball lens of the first or second plurality of ball lenses, and
    $\Phi$ represents a light source diameter, wherein the light source diameter is a circle-equivalent diameter of the light emitting surface of the corresponding light source.

4. The optical unit according to claim 1, further comprising a wall corresponding to each ball lens of the first or second plurality of ball lenses having an inner surface configured to function as a reflection surface, wherein the wall is around the corresponding ball lens, and
    the wall is configured to reflect the light from the corresponding light source toward the corresponding ball lens.

5. The optical unit according to claim 1, further comprising an optical box including at least one light source of the first or second plurality of light sources, at least one ball lens of the corresponding plurality of ball lenses, and the optical sheet, wherein the optical sheet is on a light-outputting surface side of the corresponding plurality of ball lenses.

6. The optical unit according to claim 1, wherein the plurality of ball lenses of the first or second plurality of ball lenses is arrayed and integrated with each other.

7. The optical unit according to claim 1, wherein each of the light sources of the first or second plurality of light sources has a Lambertian light distribution characteristic.

8. The optical unit according to claim 1, wherein the ball lenses of the first or second plurality of ball lenses are further configured to output collimated light.

9. An illumination apparatus, comprising:
    a first plurality of ball lenses and a first plurality of first light sources, the first plurality of ball lenses comprising ball lenses of a first type, the first light sources are the same; and
    a second plurality of ball lenses and a second plurality of second light sources, the second plurality of ball lenses comprising ball lenses of a second type in which the first type is different than the second type, the second light sources are the same,
    wherein the ball lenses of the first plurality and the second plurality of ball lenses are configured to:
    receive light from the respective light sources and condense the received light; and output the condensed light as illumination light;
each light source of the respective light sources having a light emitting surface, wherein
each light source of the respective light sources is configured to emit the light toward each ball lens of the respective ball lenses via the respective light emitting surface, and
the respective light emitting surface is located closer to the respective ball lens than a focal position of the respective ball lens; and
an optical sheet configured to:
pass a first portion of the output light that is output from the first plurality and second plurality of ball lenses; and
reflect a second portion of the output light to return to the first plurality and second plurality of ball lenses.

10. A display, comprising:
a first plurality of ball lenses corresponding to a first plurality of first light sources, the first plurality of ball lenses comprising ball lenses of a first type, the first light sources are the same; and
a second plurality of ball lenses corresponding to a second plurality of second light sources, the second plurality of ball lenses comprising ball lenses of a second type in which the first type is different than the second type, the second light sources are the same,
wherein the ball lenses of the first plurality and the second plurality of ball lenses are configured to:
receive light from the respective light sources and condense the received light; and
output the condensed light;
wherein
each of the first and second plurality of light sources has a light emitting surface,
each of the first and second plurality of light sources is configured to output the light toward of the respective ball lens via respective light emitting surface, and
the respective light emitting surface of each of the first and second plurality of light sources is located closer to the respective ball lens than a focal position of the respective ball lens; and
an optical sheet configured to:
pass a first portion of the output light that is output from the first and second plurality of ball lenses; and
reflect a second portion of the output light to return to the first and second plurality of ball lenses.

11. The display according to claim 10, further comprising an optical modulator configured to modulate light outputted from the first and second plurality of ball lenses.

12. The display according to claim 10, wherein at least one of the plurality of ball lenses of the first or second plurality of ball lenses forms one pixel.

13. An optical communication apparatus comprising:
an optical transmitter, wherein the optical transmitter includes:
a first plurality of ball lenses and a first plurality of first light sources, the first plurality of ball lenses comprising ball lenses of a first type, the first light sources are the same; and
a second plurality of ball lenses and a second plurality of second light sources, the second plurality of ball lenses comprising ball lenses of a second type in which the first type is different than the second type, the second light sources are the same,
wherein the ball lenses of the first plurality and the second plurality of ball lenses are configured to:
receive light from the respective light sources and condense the received light; and
output the condensed light;
each light source of the respective light sources having a light emitting surface,
each light source of the respective light sources is configured to emit the light toward the respective ball lens via the respective light emitting surface, and
the respective light emitting surface is located closer to the respective ball lens than a focal position of the respective ball lens; and
an optical sheet configured to:
pass a first portion of the output light that is output from the respective ball lens; and
reflect a second portion of the output light to return to the respective ball lens.

* * * * *